United States Patent
Aiba et al.

(10) Patent No.: US 9,867,184 B2
(45) Date of Patent: Jan. 9, 2018

(54) TERMINAL APPARATUS AND BASE STATION APPARATUS FOR RECEIVING AND TRANSMITTING DOWNLINK VIA PHYSICAL DOWNLINK SHARED CHANNEL (PDSCH)

(71) Applicant: Sharp Kabushiki Kaisha, Osaka-shi, Osaka (JP)

(72) Inventors: Tatsushi Aiba, Osaka (JP); Kimihiko Imamura, Osaka (JP); Shoichi Suzuki, Osaka (JP); Kazunari Yokomakura, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 51 days.

(21) Appl. No.: 15/024,445

(22) PCT Filed: Aug. 29, 2014

(86) PCT No.: PCT/JP2014/072732
§ 371 (c)(1),
(2) Date: Mar. 24, 2016

(87) PCT Pub. No.: WO2015/045731
PCT Pub. Date: Apr. 2, 2015

(65) Prior Publication Data
US 2016/0234836 A1 Aug. 11, 2016

(30) Foreign Application Priority Data
Sep. 26, 2013 (JP) .................................. 2013-199910

(51) Int. Cl.
H04W 72/04 (2009.01)
H04L 1/00 (2006.01)
(Continued)

(52) U.S. Cl.
CPC .......... *H04W 72/0446* (2013.01); *H04L 1/00* (2013.01); *H04L 1/0061* (2013.01);
(Continued)

(58) Field of Classification Search
CPC ..... H04L 1/0061; H04L 1/1812; H04L 5/005; H04L 5/1438; H04L 5/1469;
(Continued)

(56) References Cited

U.S. PATENT DOCUMENTS

| | | | |
|---|---|---|---|
| 2014/0269539 A1* | 9/2014 | Yin ....................... | H04L 5/0092 370/329 |
| 2015/0250017 A1* | 9/2015 | Ingale .................. | H04B 7/2615 370/280 |
| 2016/0050575 A1* | 2/2016 | Seo ....................... | H04W 72/04 370/252 |

OTHER PUBLICATIONS

Ericsson et al. "On Standardization impact of TDD UL-DL adaption" 3GPP TSG-RAN WG1 #72, R1-130558, 01-28-02-2013, 3 pages.*

(Continued)

*Primary Examiner* — Ian N Moore
*Assistant Examiner* — Mewale Ambaye
(74) *Attorney, Agent, or Firm* — Keating & Bennett, LLP

(57) ABSTRACT

In a terminal apparatus communicating with a base station apparatus, first information and second information are received and third information is received on a physical downlink control channel, and when the physical downlink control channel is detected and when downlink control information format 1A to which CRC parity bits scrambled by a C-RNTI are added is detected in a subframe indicated as a special subframe based on a UL-DL configuration provided in accordance with the first information and indicated as a downlink subframe based on a UL-DL configuration provided in accordance with the third information, a downlink subframe is assumed based on the UL-DL con- (Continued)

figuration provided in accordance with the third information in the subframe and a corresponding physical downlink shared channel is detected.

4 Claims, 18 Drawing Sheets

(51) Int. Cl.
    *H04L 5/00*     (2006.01)
    *H04L 1/18*     (2006.01)
    *H04L 5/14*     (2006.01)
    *H04W 88/02*     (2009.01)
    *H04W 88/08*     (2009.01)

(52) U.S. Cl.
    CPC .......... *H04L 1/1812* (2013.01); *H04L 5/0055* (2013.01); *H04L 5/0092* (2013.01); *H04L 5/1469* (2013.01); *H04W 72/042* (2013.01); *H04L 5/1438* (2013.01); *H04W 88/02* (2013.01); *H04W 88/08* (2013.01)

(58) Field of Classification Search
    CPC ........... H04W 72/042; H04W 72/0446; H04W 88/02; H04W 88/08
    See application file for complete search history.

(56) References Cited

OTHER PUBLICATIONS

Ericsson et al., "On standardization impact of TDD UL-DL adaptation", 3GPP TSG-RAN WG1 #69, R1-122016, May 21-25, 2012, pp. 1-3.

Ericsson et al., "Signalling support for dynamic TDD", 3GPP TSG-RAN WG1 #72, R1-130558, Jan. 28-Feb. 1, 2013, 3 pages.

* cited by examiner

FIG. 7

| UL-DL CONFIGURATION | DOWNLINK-TO-UPLINK SWITCH-POINT PERIODICITY | SUBFRAME NUMBERS | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 10

| SET # | (PRIMARY CELL UL-DL CONFIGURATION, SECONDARY CELL UL-DL CONFIGURATION) | SECONDARY CELL SECOND UL REFERENCE UL-DL CONFIGURATION |
|---|---|---|
| SET 1 | (1,1),(1,2),(1,4),(1,5) | 1 |
| | (2,2),(2,5) | 2 |
| | (3,3),(3,4),(3,5) | 3 |
| | (4,4),(4,5) | 4 |
| | (5,5) | 5 |
| SET 2 | (1,0),(2,0),(3,0),(4,0),(5,0),(6,0) | 0 |
| | (2,1),(4,1),(5,1) | 1 |
| | (5,2) | 2 |
| | (4,3),(5,3) | 3 |
| | (5,4) | 4 |
| | (1,6),(2,6),(3,6),(4,6),(5,6) | 6 |
| SET 3 | (3,1) | 1 |
| | (3,2),(4,2) | 2 |
| | (1,3),(2,3) | 3 |
| | (2,4) | 4 |
| SET 4 | (0,0),(6,0) | 0 |
| | (0,1),(0,2),(0,4),(0,5),(6,1),(6,2),(6,5) | 1 |
| | (0,3),(0,6) | 3 |
| | (6,4) | 4 |
| | (0,6),(6,6) | 6 |

FIG. 12

| SET # | (PRIMARY CELL UL-DL CONFIGURATION, SECONDARY CELL UL-DL CONFIGURATION) | SECONDARY CELL SECOND DOWNLINK REFERENCE UL-DL CONFIGURATION |
|---|---|---|
| SET 1 | (0,0) | 0 |
| | (1,0),(1,1),(1,6) | 1 |
| | (2,0),(2,2),(2,1),(2,6) | 2 |
| | (3,0),(3,3),(3,6) | 3 |
| | (4,0),(4,1),(4,3),(4,4),(4,6) | 4 |
| | (5,0),(5,1),(5,2),(5,3),(5,4),(5,5),(5,6) | 5 |
| | (6,0),(6,6) | 6 |
| SET 2 | (0,1),(6,1) | 1 |
| | (0,2),(1,2),(6,2) | 2 |
| | (0,3),(6,3) | 3 |
| | (0,4),(1,4),(3,4),(6,4) | 4 |
| | (0,5),(1,5),(2,5),(3,5),(4,5),(6,5) | 5 |
| | (0,6) | 6 |
| SET 3 | (3,1),(1,3) | 4 |
| | (3,2),(4,2),(2,3),(2,4) | 5 |
| SET 4 | (0,1),(02),(0,3),(0,4),(0,5),(0,6) | 0 |
| | (1,2),(1,4),(1,5) | 1 |
| | (2,5) | 2 |
| | (3,4),(3,5) | 3 |
| | (4,5) | 4 |
| | (6,1),(6,2),(6,3),(6,4),(6,5) | 6 |
| SET 5 | (1,3) | 1 |
| | (2,3),(2,4) | 2 |
| | (3,1),(3,2) | 3 |
| | (4,2) | 4 |

FIG. 13

| UL-DL CONFIGURATION | SUBFRAME NUMBERS | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 14

| UL-DL CONFIGURATION | SUBFRAME NUMBERS | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 15

| UL-DL CONFIGURATION | SUBFRAME NUMBERS | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

TERMINAL APPARATUS AND BASE STATION APPARATUS FOR RECEIVING AND TRANSMITTING DOWNLINK VIA PHYSICAL DOWNLINK SHARED CHANNEL (PDSCH)

TECHNICAL FIELD

The present invention relates to a terminal apparatus, a base station apparatus, an integrated circuit, and a communication method.

Priority is claimed on Japanese Patent Application No. 2013-199910, filed Sep. 26, 2013, the content of which is incorporated herein by reference.

BACKGROUND ART

Radio access schemes and radio networks (hereinafter referred to as a long term evolution (LTE) or an evolved universal terrestrial radio access (EUTRA)) of cellular mobile communication have been examined in the 3rd Generation Partnership Project (3GPP). In the LTE, a base station apparatus is referred to as an evolved NodeB (eNodeB) and a terminal apparatus is referred to as user equipment (UE). The LTE is a cellular communication system in which a plurality of areas covered by base station apparatuses are arranged in cell forms. A single base station apparatus may manage a plurality of cells.

The LTE may correspond to time division duplex (TDD). The LTE adopting a TDD scheme is referred to as a TD-LTE or LTE TDD. In the TDD, uplink and downlink signals are subjected to time division multiplexing.

The 3GPP have examined that traffic adaptation technologies and interference management and traffic adaptation technologies (DL-UL Interference Management and Traffic Adaptation) are applied to the TD-LTE. A traffic adaption technology is a technology for changing a ratio between an uplink resource and a downlink resource according to an uplink traffic and a downlink traffic. The traffic adaptation technology is also referred to as a dynamic TDD.

In NPL 1, a method of using a flexible subframe is suggested as a method of realizing traffic adaptation. A base station apparatus can receive an uplink signal or transmit a downlink signal in a flexible subframe. In NPL 1, a terminal apparatus regards a flexible subframe as a downlink subframe unless the terminal apparatus receives an indication to transmit an uplink signal in the flexible subframe from the base station apparatus.

NPL 1 discloses that an HARQ (hybrid automatic repeat request) timing with respect to a PDSCH (physical downlink shared channel) is determined based on newly introduced UL-DL configuration (uplink-downlink configuration) and an HARQ timing with respect to a physical uplink shared channel (PUSCH) is determined based on initial UL-DL configuration.

NPL 2 discloses that (a) UL/DL reference configuration is introduced and (b) some subframes can be scheduled for either of an uplink and a downlink via dynamic grant/assignment from a scheduler.

CITATION LIST

Non Patent Document

[NON PATENT DOCUMENT 1] "On standardization impact of TDD UL-DL adaptation", R1-122016, Ericsson, ST-Ericsson, 3GPP TSG-RAN WG1 Meeting #69, Prague, Czech Republic, 21-25 May 2012

[NON PATENT DOCUMENT 2] "Signaling support for dynamic TDD", R1-130558, Ericsson, ST-Ericsson, 3GPP TSG-RAN WG1 Meeting #72, St Julian's, Malta, 28 Jan. to 1 Feb. 2013

DISCLOSURE OF THE INVENTION

Problems to be Solved by the Invention

In the above-described radio communication systems, however, a specific procedure when a terminal apparatus receives downlink data is not described. For example, a specific procedure when a base station apparatus and a terminal apparatus transmit and receive downlink data using a Physical Downlink Shared Channel (PDSCH) is not described.

The present invention is devised to the foregoing circumstance and an object of the present invention is to provide a terminal apparatus, a base station apparatus, an integrated circuit, and a communication method capable of efficiently transmitting and receiving downlink data.

Means for Solving the Problems (1) To achieve the foregoing object, the present invention has contrived the following means. That is, according to an aspect of the invention, there is provided a terminal apparatus communicating with a base station apparatus and including: a reception unit that receives first information and second information, receives third information on a physical downlink control channel, in a case in which the physical downlink control channel is detected and when downlink control information format 1A to which CRC parity bits scrambled by a C-RNTI are attached is detected in a subframe (n1−k1) indicated as a special subframe based on a UL-DL configuration provided in accordance with the first information and indicated as a downlink subframe based on a UL-DL configuration provided in accordance with the third information, detects a corresponding physical downlink shared channel by assuming the downlink subframe based on the UL-DL configuration provided in accordance with the third information in the subframe (n1−k1) and detects a corresponding physical downlink shared channel, and in a case in which the physical downlink control channel is not detected and when the downlink control information format 1A to which the CRC parity bits scrambled by the C-RNTI are attached is detected in a subframe (n2−k2) indicated as a special subframe based on the UL-DL configuration provided in accordance with the first information, detects a corresponding physical downlink shared channel by assuming the special subframe based on the UL-DL configuration provided in accordance with the first information in the subframe (n2−k2); and a transmission unit that transmits an HARQ-ACK for the physical downlink shared channel detected in the subframe (n1−k1), in a subframe (n1) and transmits an HARQ-ACK for the physical downlink shared channel detected in the subframe (n2−k2), in a subframe (n2). The k1 and the k2 are based on a UL-DL configuration provided in accordance with the second information.

(2) According to another aspect of the invention, there is provided a base station apparatus communicating with a terminal apparatus and including: a transmission unit that transmits first information and second information, transmits third information on a physical downlink control channel, in a case in which the transmission on the physical downlink control channel is performed and when downlink control information format 1A to which CRC parity bits scrambled by a C-RNTI are attached is transmitted in a subframe (n1−k1) indicated as a special subframe based on a UL-DL configuration provided in accordance with the first information and indicated as a downlink subframe based on a UL-DL configuration provided in accordance with the third information, transmits a corresponding physical downlink shared channel by assuming the downlink subframe based on the UL-DL configuration provided in accordance with the third information in the subframe (n1−k1), and in a case in which the transmission on the physical downlink control channel is not performed and when the downlink control information format 1A to which the CRC parity bits scrambled by the C-RNTI are attached is transmitted in a subframe (n2−k2) indicated as the special subframe based on the UL-DL configuration provided in accordance with the first information, transmits a corresponding physical downlink shared channel by assuming the special subframe based on the UL-DL configuration provided in accordance with the first information in the subframe (n2−k2); and a reception unit that receives an HARQ-ACK for the physical downlink shared channel detected in the subframe (n1−k1), in a subframe (n1) and receives an HARQ-ACK for the physical downlink shared channel detected in the subframe (n2−k2), in a subframe (n2). The k1 and the k2 are based on a UL-DL configuration provided in accordance with the second information.

(3) According to still another aspect of the invention, there is provided an integrated circuit mounted on a terminal apparatus communicating with a base station apparatus and causing the terminal apparatus to have: a function of receiving first information and second information, receiving third information on a physical downlink control channel, in a case in which the physical downlink control channel is detected and when downlink control information format 1A to which CRC parity bits scrambled by a C-RNTI are attached is detected in a subframe (n1−k1) indicated as a special subframe based on a UL-DL configuration provided in accordance with the first information and indicated as a downlink subframe based on a UL-DL configuration provided in accordance with the third information, detecting a corresponding physical downlink shared channel by assuming the downlink subframe based on the UL-DL configuration provided in accordance with the third information in the subframe (n1−k1), and in a case in which the physical downlink control channel is not detected and when the downlink control information format 1A to which the CRC parity bits scrambled by the C-RNTI are attached is detected in a subframe (n2−k2) indicated as a special subframe based on the UL-DL configuration provided in accordance with the first information, detecting a corresponding physical downlink shared channel by assuming the special subframe based on the UL-DL configuration provided in accordance with the first information in the subframe (n2−k2) and; a function of transmitting an HARQ-ACK for the physical downlink shared channel detected in the subframe (n1−k1), in a subframe (n1), and transmitting an HARQ-ACK for the physical downlink shared channel detected in the subframe (n2−k2), in a subframe (n2). The k1 and the k2 are based on a UL-DL configuration provided in accordance with the second information.

(4) According to further still another aspect of the invention, there is provided an integrated circuit mounted on a base station apparatus communicating with a terminal apparatus and causing the base station apparatus to have: a function of transmitting first information and second information, transmitting third information on a physical downlink control channel, in a case in which the transmission on the physical downlink control channel is not performed and when downlink control information format 1A to which CRC parity bits scrambled by a C-RNTI are attached is transmitted in a subframe (n1−k1) indicated as a special subframe based on a UL-DL configuration provided in accordance with the first information and indicated as a downlink subframe based on a UL-DL configuration provided in accordance with the third information, transmitting a corresponding physical downlink shared channel by assuming the downlink subframe based on the UL-DL configuration provided in accordance with the third information in the subframe (n1−k1), and in a case in which the transmission on the physical downlink control channel is performed and when the downlink control information format 1A to which the CRC parity bits scrambled by the C-RNTI are attached is transmitted in a subframe (n2−k2) indicated as the special subframe based on the UL-DL configuration provided in accordance with the first information, transmitting a corresponding physical downlink shared channel by assuming the special subframe based on the UL-DL configuration provided in accordance with the first information in the subframe (n2−k2); and a function of receiving an HARQ-ACK for the physical downlink shared channel detected in the subframe (n1−k1), in a subframe (n1), and receiving an HARQ-ACK for the physical downlink shared channel detected in the subframe (n2−k2), in a subframe (n2). The k1 and the k2 are based on a UL-DL configuration provided in accordance with the second information.

(5) According to further still another aspect of the invention, there is provided a communication method of a terminal apparatus communicating with a base station apparatus, the method including: receiving first information and second information, receiving third information on a physical downlink control channel, in a case in which the physical downlink control channel is detected and when downlink control information format 1A to which CRC parity bits scrambled by a C-RNTI are attached is detected in a subframe (n1−k1) indicated as a special subframe based on a UL-DL configuration provided in accordance with the first information and indicated as a downlink subframe based on a UL-DL configuration provided in accordance with the third information, detecting a corresponding physical downlink shared channel by assuming the downlink subframe based on the UL-DL configuration provided in accordance with the third information in the subframe (n1−k1), and in a case in which the physical downlink control channel is not detected and when the downlink control information format 1A to which the CRC parity bits scrambled by the C-RNTI are attached is detected in a subframe (n2−k2) indicated as a special subframe based on the UL-DL configuration provided in accordance with the first information, detecting a corresponding physical downlink shared channel by assuming the special subframe based on the UL-DL configuration provided in accordance with the first information in the subframe (n2−k2); transmitting an HARQ-ACK for the physical downlink shared channel detected in the subframe (n1−k1), in a subframe (n1), and transmitting an HARQ-ACK for the physical downlink shared channel detected in the subframe (n2−k2), in a subframe (n2). The k1 and the k2 are based on a UL-DL configuration provided in accordance with the second information.

(6) According to further still another aspect of the invention, there is provided a communication method of a base station apparatus communicating with a terminal apparatus, the method including: transmitting first information and second information, transmitting third information on a physical downlink control channel, in a case in which the transmission on the physical downlink control channel is not performed and when downlink control information format 1A to which CRC parity bits scrambled by a C-RNTI are attached is transmitted in a subframe (n1−k1) indicated as a special subframe based on a UL-DL configuration provided in accordance with the first information and indicated as a downlink subframe based on a UL-DL configuration provided in accordance with the third information, transmitting a corresponding physical downlink shared channel by assuming the downlink subframe based on the UL-DL configuration provided in accordance with the third information in the subframe (n1−k1), and in a case in which the transmission on the physical downlink control channel is performed and when the downlink control information format 1A to which the CRC parity bits scrambled by the C-RNTI are attached is transmitted in a subframe (n2−k2) indicated as the special subframe based on the UL-DL configuration provided in accordance with the first information, transmitting a corresponding physical downlink shared channel by assuming the special subframe based on the UL-DL configuration provided in accordance with the first information in the subframe (n2−k2); and receiving an HARQ-ACK for the physical downlink shared channel detected in the subframe (n1−k1), in a subframe (n1), and receiving an HARQ-ACK for the physical downlink shared channel detected in the subframe (n2−k2), in a subframe (n2). The k1 and the k2 are based on a UL-DL configuration provided in accordance with the second information.

Effects of the Invention

According to the aspects of the present invention, it is possible to efficiently transmitting and receiving downlink data.

BRIEF DESCRIPTION OF THE DRAWINGS

FIG. 7 is a table illustrating an example of uplink-downlink (UL-DL) configuration.

FIG. 10 is a diagram illustrating a pair formed by the first UL reference UL-DL configuration for another serving cell (primary cell) and the first UL reference UL-DL configuration for a serving cell (secondary cell) and correspondence to the second UL reference UL-DL configuration for the secondary cell.

FIG. 12 is a diagram illustrating a pair formed by the first DL reference UL-DL configuration for the primary cell and the first DL reference UL-DL configuration for the secondary cell and correspondence to the second DL reference UL-DL configuration for the secondary cell.

FIG. 13 is a diagram illustrating correspondence between subframe n in which PDCCH/EPDCCH/PHICH are arranged and subframe n+k in which PUSCHs corresponding to the PDCCH/EPDCCH/PHICH are arranged.

FIG. 14 is a diagram illustrating correspondence between subframe n in which PUSCH is arranged and subframe n+k in which PHICH corresponding to the PUSCH is arranged.

FIG. 15 is a diagram illustrating correspondence between subframe n−k in which PDSCH is arranged and subframe n in which HARQ-ACK corresponding to the PDSCH is transmitted.

MODE FOR CARRYING OUT THE INVENTION

Hereinafter, an embodiment of the present invention will be described.

In the embodiment, terminal apparatuses may be configured in a plurality of cells. A technology for enabling a terminal apparatus to perform communication via a plurality of cells is referred to as cell aggregation or carrier aggregation. Here, the embodiment may also be applied to each of the plurality of cells configured in the terminal apparatuses. The present invention may also be applied to some of the plurality of configured cells configured in the terminal apparatuses. Here, a cell configured in a terminal apparatus is also referred to as a serving cell.

The plurality of configured serving cells include one primary cell and one or a plurality of secondary cells. The primary cell is a serving cell in which an initial connection establishment procedure is performed, a serving cell in which a connection re-establishment procedure starts, or a cell which is indicated as a primary cell in a handover procedure. When or after RRC connection is established, the secondary cells may be configured.

At least a time division duplex (TDD) scheme is applied to a radio communication system according to the embodiment. In the case of the cell aggregation, for example, the TDD scheme may be applied to all of the plurality of cells. In the case of the cell aggregation, cells to which the TDD scheme is applied and cells to which a frequency division duplex (FDD) scheme is applied may be aggregated. That is, in the case of the cell aggregation, the embodiment can be applied to some cells.

Figure 1:
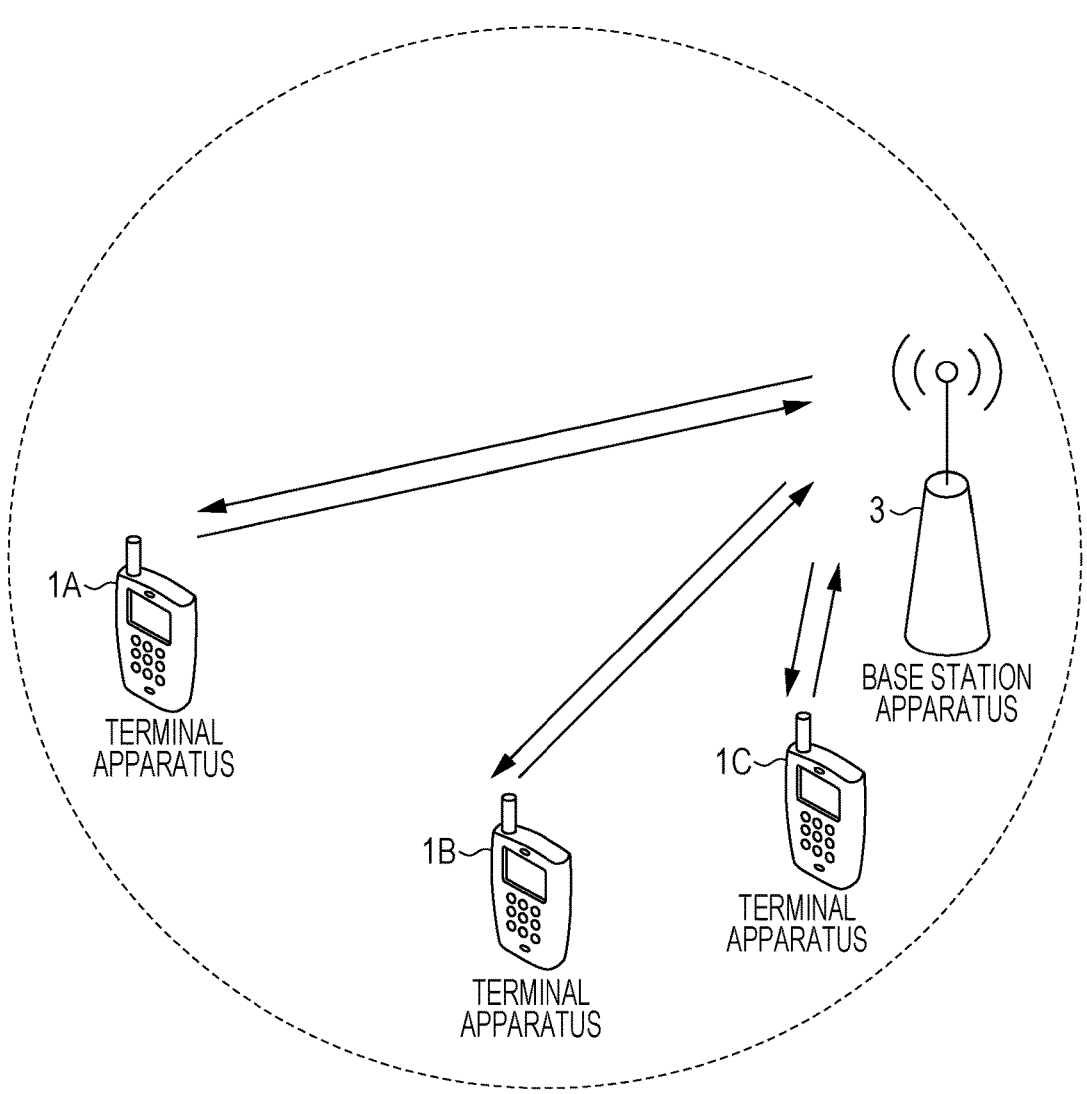
FIG. 1 is a conceptual diagram illustrating a radio communication system according to an embodiment.

FIG. 1 is a conceptual diagram illustrating a radio communication system according to the embodiment. In FIG. 1, the radio communication system according to the embodiment includes terminal apparatuses 1A to 1C and a base station apparatus 3. Hereinafter, the terminal apparatuses 1A to 1C are also referred to as the terminal apparatuses 1.

Physical channels and physical signals according to the embodiment will be described.

In FIG. 1, the following uplink physical channels are used in uplink radio communication from the terminal apparatus 1 to the base station apparatus 3. The uplink physical channels are used to transmit information output from higher layers.

PUCCH (Physical Uplink Control Channel)
PUSCH (Physical Uplink Shared Channel)
PRACH (Physical Random Access Channel)

The PUCCH is a physical channel that is used to transmit uplink control information (UCI). The uplink control information includes channel state information (CSI) of a downlink, a scheduling request (SR) indicating a request for a PUSCH resource, and ACK (acknowledgement)/NACK (negative acknowledgement) to downlink data (Transport block, Downlink-Shared Channel: DL-SCH). Here, the ACK/NACK is referred to as HARQ-ACK, HARQ feedback, or acknowledgement information.

The PUSCH is used to transmit uplink data (Transport block, Uplink-Shared Channel: UL-SCH). That is, the transmission of the uplink data on the UL-SCH is performed via the PUSCH. That is, the UL-SCH which is a transport channel is mapped to the PUSCH which is a physical channel. The PUSCH may also be used to transmit HARQ-ACK and/or channel state information along with the uplink data. The PUSCH may be used to transmit only the channel state information or only the HARQ-ACK and the channel state information.

The PUSCH is used to transmit an RRC message. The RRC message is information/signal that is processed in a radio resource control (RRC) layer. The PUSCH is used to transmit a MAC CE (control element). Here, the MAC CE is information/signal that is processed (transmitted) in the medium access control (MAC) layer.

The PRACH is used to transmit a random access preamble. Further, the PRACH is also used to indicate an initial connection establishment procedure, a handover procedure, a connection re-establishment procedure, synchronization (timing adjustment) for uplink transmission, and a request for PUSCH resources.

In FIG. 1, the following uplink physical signal is used in the uplink radio communication. The uplink physical signal is not used to transmit information output from a higher layer, but is used in the physical layer.

Uplink Reference Signal (UL RS)

In the embodiment, the following two types of uplink reference signals are used.

DMRS (Demodulation Reference Signal)
SRS (Sounding Reference Signal)

The DMRS is related to transmission of the PUSCH or the PUCCH. The DMRS is subjected to time-domain multiplexing with the PUSCH or the PUCCH. For example, the base station apparatus 3 uses the DMRS to perform channel correction of the PUSCH or the PUCCH.

The SRS is not related to the transmission of the PUSCH or the PUCCH. The base station apparatus 3 uses the SRS to measure an uplink channel state. The terminal apparatus 1 transmits a first SRS in a first resource set in a higher layer. Further, the terminal apparatus 1 transmits a second SRS in a second resource set in a higher layer only once when the terminal apparatus 1 receives information indicating a request to transmit the SRS via the PDCCH. Here, the first SRS is also referred to as a periodic SRS or a type 0 triggered SRS. The second SRS is also referred to as an aperiodic SRS or a type 1 triggered SRS.

In FIG. 1, the following downlink physical channels are used in downlink radio communication from the base station apparatus 3 to the terminal apparatus 1. The downlink physical channels are used to transmit information output from higher layers.

PBCH (Physical Broadcast Channel)
PCFICH (Physical Control Format Indicator Channel)
PHICH (Physical Hybrid automatic repeat request Indictor Channel)
PDCCH (Physical Downlink Control Channel)
EPDCCH (Enhanced Physical Downlink Control Channel)
PDSCH (Physical Downlink Shared Channel)
PMCH (Physical Multicast Channel)

The PBCH is used to report a master information block (MIB, broadcast channel: BCH) used commonly in the terminal apparatuses 1. For example, the MIB is transmitted at intervals of 40 ms. The MIB is repeatedly transmitted at a period of 10 ms. The MIB includes information indicating system frame number (SFN). Here, the SFN indicates a radio frame number. The MIB is system information.

The PCFICH is used to transmit information indicating a domain (OFDM symbol) used to transmit the PDCCH.

The PHICH is used to transmit an HARQ indicator (HARQ feedback, acknowledgement information) indicating ACK (ACKnowledgement) or NACK (Negative ACKnowledgement) to uplink data (Uplink shared Channel: UL-SCH) received by the base station apparatus 3.

The PDCCH and the EPDCCH are used to transmit downlink control information (DCI). Here, a plurality of DCI formats are defined in transmission of downlink control information. That is, a field for the downlink control information is defined with the DCI format and is mapped to an information bit.

For example, DCI format 1A and DCI format 1C used to schedule one PDSCH (transmission of one downlink transport block) in one cell are defined as the DCI formats for a downlink.

For example, the DCI format for a downlink includes information regarding the scheduling of the PDSCH. For example, the DCI format for a downlink includes downlink control information such as information regarding resource block assignment, information regarding a modulation and coding scheme (MCS), and information regarding a TPC command for the PUCCH. Here, the DCI format for a downlink is also referred to as a downlink grant (or downlink assignment).

For example, DCI format 0 used to schedule one PUSCH (transmission of one uplink transport block) in one cell is defined as the DCI format for an uplink.

For example, the DCI format for an uplink includes information regarding scheduling of the PUSCH. For example, the DCI format for an uplink includes downlink control information such as information regarding resource block assignment and/or hopping (hopping resource allocation), information regarding a modulation and coding scheme (MCS) and/or redundancy version, information regarding a TPC command, information regarding cyclic shift, and information regarding a new data indicator. Here, the DCI format for an uplink is also referred to as uplink grant (or uplink assignment).

When the resource of the PDSCH is scheduled using the downlink assignment, the terminal apparatus 1 receives downlink data on the scheduled PDSCH. When the resource of the PUSCH is scheduled using the uplink grant, the terminal apparatus 1 transmits uplink data and/or uplink control information on the scheduled PUSCH.

The terminal apparatus 1 monitors a PDCCH candidate and/or EPDCCH candidate set. In the following description, the PDCCH indicates the PDCCH and/or EPDCCH. The PDCCH candidates refer to candidates for which there is a possibility of the PDCCH being mapped and transmitted by the base station apparatus 3. The monitoring may include a meaning that the terminal apparatus 1 tries to decode each PDCCH in the PDCCH candidate set according to all the DCI formats to be monitored.

Here, the PDCCH candidate set monitored by the terminal apparatus 1 is also referred to as a search space. The search space includes a common search space (CSS) and a user equipment (UE)-specific search space (USS). The CSS is a region in which the plurality of terminal apparatuses 1 commonly monitor the PDCCH/EPDCCH. The USS is a region which is defined based on at least a C-RNTI. The terminal apparatus 1 monitors the PDCCH in the CSS and/or the USS and detects the PDCCH destined for the terminal apparatus.

An RNTI assigned to the terminal apparatus 1 by the base station apparatus 3 is used to transmit the downlink control information (transmission on the PDCCH). Specifically, cyclic redundancy check (CRC) parity bits are attached to the DCI format (which may be the downlink control information) and the CRC parity bits are scrambled by the RNTI after the attachment. Here, the CRC parity bits attached to the DCI format may be obtained from a payload of the DCI format.

The terminal apparatus 1 attempts to decode the DCI format to which the CRC parity bits scrambled by the RNTI are attached and detects the DCI format for which the CRC is successful as the DCI format destined for the terminal apparatus (which is also referred to as blind decoding). That is, the terminal apparatus 1 detects the PDCCH with the CRC scrambled by the RNTI. The terminal apparatus 1 detects the PDCCH with the DCI format to which the CRC parity bits scrambled by the RNTI are attached.

Here, the RNTI includes a C-RNTI (cell-radio network temporary identifier). The C-RNTI is an identifier unique to the terminal apparatus 1 and used to identify RRC connection and scheduling. The C-RNTI is used for dynamically scheduled unicast transmission.

The RNTI includes an SPS C-RNTI (semi-persistent scheduling C-RNTI). The SPS C-RNTI is an identifier unique to the terminal apparatus 1 and used for semi-persistent scheduling. The SPS C-RNTI is used for semi-persistently scheduled unicast transmission.

The RNTI includes RA-RNTI (Random Access RNTI). The RA-RNTI is an identifier used to transmit a random access response message. That is, the RA-RNTI is used to transmit the random access response message in the random access procedure. For example, when the terminal apparatus 1 transmits a random access preamble, the terminal apparatus 1 monitors the PDCCH with the CRC scrambled by the RA-RNTI. The terminal apparatus 1 receives a random access response on the PDSCH based on detection of the PDCCH with the CRC scrambled by the RA-RNTI.

The RNTI includes a P-RNTI (paging RNTI). The P-RNTI is an identifier used to notify of a paging and a change in system information. For example, the P-RNTI is used to transmit a paging and a system information message. The terminal apparatus 1 receives the paging on the PDSCH based on detection of the PDCCH with the CRC scrambled by the P-RNTI.

The RNTI includes an SI-RNTI (system information RNTI). The SI-RNTI is an identifier used to broadcast the system information. For example, the SI-RNTI is used to transmit a system information message. The terminal apparatus 1 receives the system information message on the PDSCH based on detection of the PDCCH with the CRC scrambled by the SI-RNTI.

For example, the PDCCH with the CRC scrambled by the C-RNTI may be transmitted in the USS or the CSS. The PDCCH with the CRC scrambled by the RA-RNTI may be transmitted in only the CSS. The PDCCH with the CRC scrambled by the P-RNTI may be transmitted in only the CSS. The PDCCH with the CRC scrambled by the SI-RNTI may be transmitted in only the CSS.

For example, DCI format 1A is included in the DCI format to which the CRC parity bits scrambled by the C-RNTI or the SPS C-RNTI are attached. Further, DCI format 1A and DCI format 1C are included in the DCI format to which the CRC parity bits scrambled by the RA-RNTI, the SI-RNTI, or the P-RNTI are attached.

The CRC parity bits scrambled by the C-RNTI, SPS C-RNTI, the RA-RNTI, the P-RNTI, or the SI-RNTI are attached to DCI format 1A. Further, the CRC parity bits scrambled by the RA-RNTI, the P-RNTI, or the SI-RNTI are attached to DCI format 1C.

The terminal apparatus 1 changes interpretation of DCI format 1A based on whether the CRC parity bits attached to DCI format 1A are scrambled to any RNTI. Hereinafter, transmission of downlink data on the PDSCH is referred to as transmission on the PDSCH. Further, reception of downlink data on the PDSCH is referred to as reception on the PDSCH.

The PDSCH is used to transmit downlink data (downlink transport block, DL-SCH). The PDSCH is used to transmit a system information block type 1 message. The system information block type 1 message is cell-specific information.

The PDSCH is used to transmit a system information message. The system information message may include a system information block X other than system information block type 1. The system information message is cell-specific information.

The PDSCH is used to transmit an RRC message. Here, the RRC message transmitted from the base station apparatus 3 may be common in the plurality of terminal apparatuses 1 in a cell. The RRC message transmitted from the base station apparatus 3 may be a dedicated message (which is also referred to as a dedicated signaling) to the certain terminal apparatus 1. That is, the information specific to a user apparatus is transmitted using the dedicated message to the certain terminal apparatus 1. The PDSCH is used to transmit the MAC CE.

Here, the RRC message and/or the MAC CE are also referred to as a higher layer signaling.

The PMCH is used to transmit multicast data (Multicast Channel: MCH).

In FIG. 1, the following downlink physical signals are used in downlink radio communication. The downlink physical signals are not used to transmit information output from higher layers, but are used in the physical layer.

Synchronization Signal (SS)

Downlink Reference Signal (DL RS)

The synchronization signal is used for the terminal apparatus 1 to take synchronization of a frequency region and a time region of a downlink. In the TDD scheme, for example, synchronization signals are arranged in subframes 0, 1, 5, and 6 of a radio frame. In the FDD scheme, synchronization signals are arranged in subframes 0 and 5 of a radio frame.

The downlink reference signal is used for the terminal apparatus 1 to correct a channel of a downlink physical channel. The downlink reference signal is used for the terminal apparatus 1 to calculate downlink channel state information.

In the embodiment, the following five types of downlink reference signals are used.

CRS (Cell-specific Reference Signal)

URS (UE-specific Reference Signal) associated with PDSCH

DMRS (Demodulation Reference Signal) associated with EPDCCH

NZP CSI-RS (Non-Zero Power Channel State Information-Reference Signal)

ZP CSI-RS (Zero Power Channel State Information-Reference Signal)

MBSFN RS (Multimedia Broadcast and Multicast Service over Signal Frequency Network Reference signal)

PRS (Positioning Reference Signal)

The CRS is transmitted in the entire band of a subframe. The CRS is used to demodulate the PBCH/PDCCH/PHICH/PCFICH/PDSCH. The CRS may be used for the terminal apparatus 1 to calculate the downlink channel state information. The PBCH/PDCCH/PHICH/PCFICH is transmitted on an antenna port used for transmission of the CRS.

The URS associated with the PDSCH is transmitted in a subframe and a band used for transmission of the PDSCH with which the URS is associated. The URS is used to demodulate the PDSCH with which the URS is associated.

The PDSCH is transmitted with an antenna port used for transmission of the CRS the URS. A DCI format 1A is used for scheduling of the PDSCH transmitted with the antenna port used for transmission of the CRS. For example, the CRS is transmitted on one of an antenna port i (where i=0, 1, 2, or 3) or on several antenna ports (on one or several of antenna ports 0 to 3).

The DMRS associated with the EPDCCH is transmitted in a subframe and a bandwidth used for transmission of the EPDCCH with which the DMRS is associated. The DMRS is used to demodulate the EPDCCH with which the DMRS is associated. The EPDCCH is transmitted with an antenna port used for transmission of the DMRS.

The NZP CSI-RS is transmitted in a configured subframe. A resource transmitted by the NZP CSI-RS is configured by the base station apparatus. The NZP CSI-RS is used for the terminal apparatus 1 to calculate the downlink channel state information. The terminal apparatus 1 performs signal measurement (channel measurement) using the NZP CSI-RS.

The resource of the ZP CSI-RS is configured by the base station apparatus 3. The base station apparatus 3 transmits the ZP CSI-RS with a zero output power. That is, the base station apparatus 3 does not transmit the ZP CSI-RS. The base station apparatus 3 does not transmit the PDSCH and the EPDCCH in the configured resource of the ZP CSI-RS. For example, in a resource to which the NZP CSI-RS corresponds in a certain cell, the terminal apparatus 1 can measure interference.

The MBSFN RS is transmitted in the entire bandwidth of a subframe used for transmission of the PMCH. The MBSFN RS is used to demodulate the PMCH. The PMCH is transmitted on an antenna port used for transmission of the MBSFN RS.

The PRS is used for the terminal apparatus to measure a geographic location of the terminal apparatus.

The downlink physical channels and the downlink physical signals are collectively referred to as downlink signals. The uplink physical channels and the uplink physical signals are collectively referred to as uplink signals. The downlink physical channels and the uplink physical channels are collectively referred to as physical channels. The downlink physical signals and the uplink physical signals are collectively referred to as physical signals.

The BCH, MCH, UL-SCH, and DL-SCH are transport channels. A channel used in the Medium Access Control (MAC) layer is referred to as a transport channel. Units of transport channels used in the MAC layer are referred to as a transport block (TB) or a MAC protocol data unit (PDU). In the MAC layer, control of Hybrid Automatic Repeat reQuest (HARQ) is performed for each transport block. The transport block is units of data delivered from the MAC layer to the physical layer. In the physical layer, the transport block is mapped to a code word and a coding process is performed for each code word.

Hereinafter, the structure of a radio frame will be described.

Figure 2:
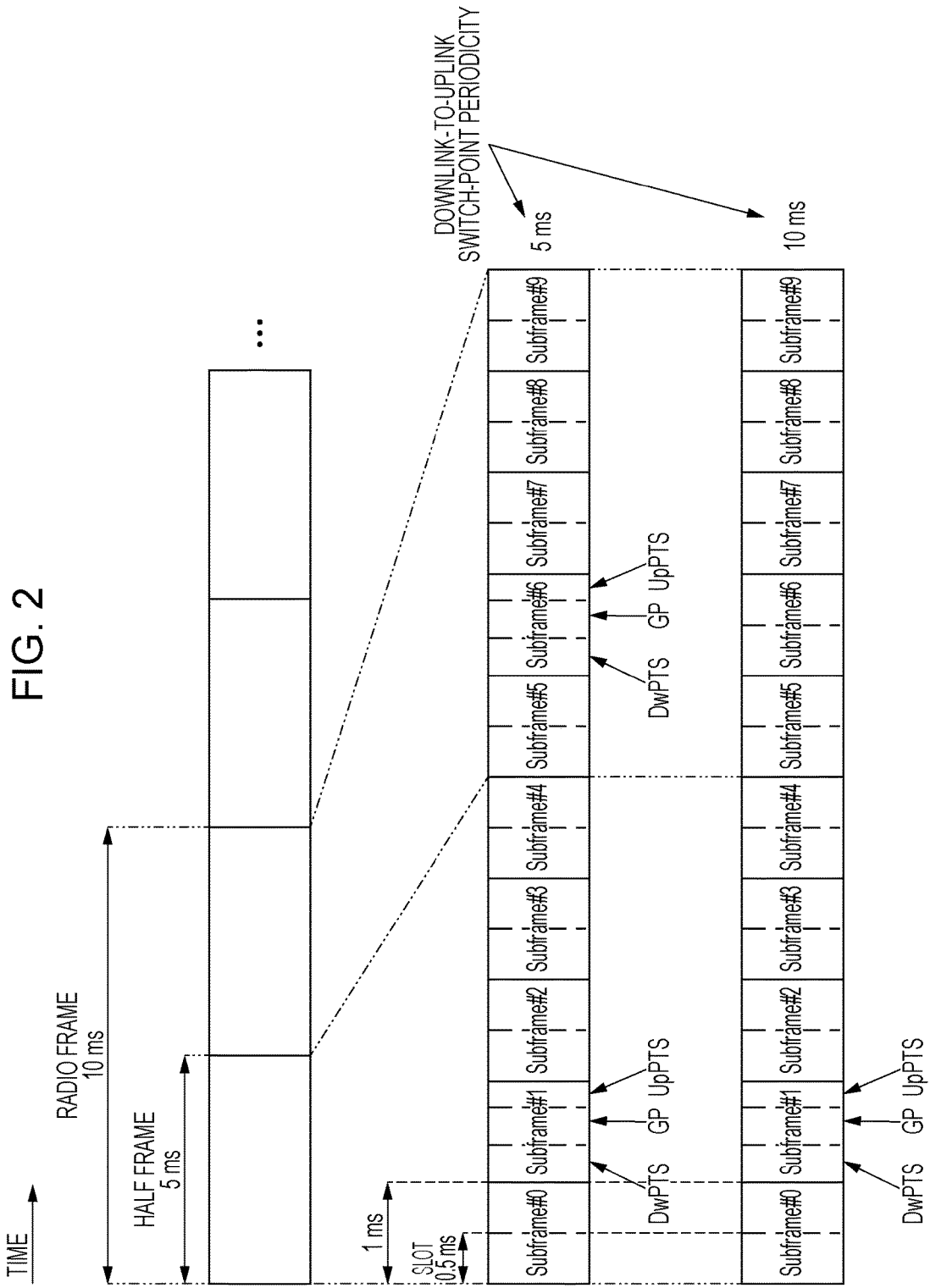
FIG. 2 is a diagram illustrating the structure of a radio frame.

FIG. 2 is a diagram illustrating an overall structure of a radio frame according to the embodiment. In FIG. 2, the horizontal axis is a time axis. For example, each of the radio frames has a length of 10 ms. Each of the radio frames is configured to include two half frames. Each of the half frames has a length of 5 ms. Each of the half frames is configured to include five subframes. Each of the subframes has a length of 1 ms and is defined by two contiguous slots. Each of the slots has a length of 0.5 ms. An i-th subframe in the radio frame includes a (2×i)-th slot and a (2×i+1)-th slot. That is, ten subframes can be used at intervals of 10 ms. Here, the subframe is also referred to as a transmission time interval (TTI).

In the embodiment, the following three types of subframes are defined.

Downlink Subframe (first subframe)

Uplink Subframe (second subframe)

Special Subframe (third subframe)

The downlink subframe is a subframe reserved for downlink transmission. The uplink subframe is a subframe reserved for uplink transmission. Here, the downlink subframe may include an MBSFN subframe and/or a non-MBSFN subframe.

The base station apparatus 3 may configure the subset of a downlink subframe in a radio frame as an MBSFN subframe. Here, the MBSFN subframe is a subframe reserved for MBSFN. For example, the MBSFN subframe may be indicated for each serving cell based on a parameter transmitted using a higher layer signal by the base station apparatus 3.

A subframe not configured as the MBSFN subframe in a radio frame is also referred to as a non-MBSFN subframe or a unicast subframe.

For example, the base station apparatus 3 can perform transmission on the PDSCH and may not perform transmission on the PMCH in the non-MBSFN subframe. The terminal apparatus 1 decodes the PDSCH in the non-MBSFN subframe. The base station apparatus 3 can perform transmission on the PDSCH and transmission on the PMCH in the MBSFN subframe. The terminal apparatus 1 decodes the PDSCH in the subframe indicated to decode the PMCH using a signal of the higher layer and the MBSFN subframe other than the subframe in which the an occasion of the PRS is set only in the MBSFN subframe and a part of the occasion of the PRS is set in accordance with the higher layer when the length of the CP cyclic prefix) in subframe 0 is the normal CP.

The special subframe includes three fields. The three fields are a DwPTS (Downlink Pilot Time Slot), a GP (Guard Period), an UpPTS (Uplink Pilot Time Slot). A total length of the DwPTS, the GP, and the UpPTS is 1 ms. The DwPTS is a field reserved for downlink transmission. The UpPTS is a field reserved for uplink transmission. The GP is a field for which the downlink transmission and the uplink transmission are not performed. The special subframe may include only the DwPTS and the GP or may include only the GP and the UpPTS.

That is, subframe 0, subframe 5, and the DwPTS may be normally reserved for downlink transmission. The UpPTS and the subframe after the special subframe may be normally reserved for uplink transmission.

That is, a single radio frame includes at least a downlink subframe, an uplink subframe, and a special subframe.

Hereinafter, the structure of a slot according to the embodiment will be described.

Figure 3:
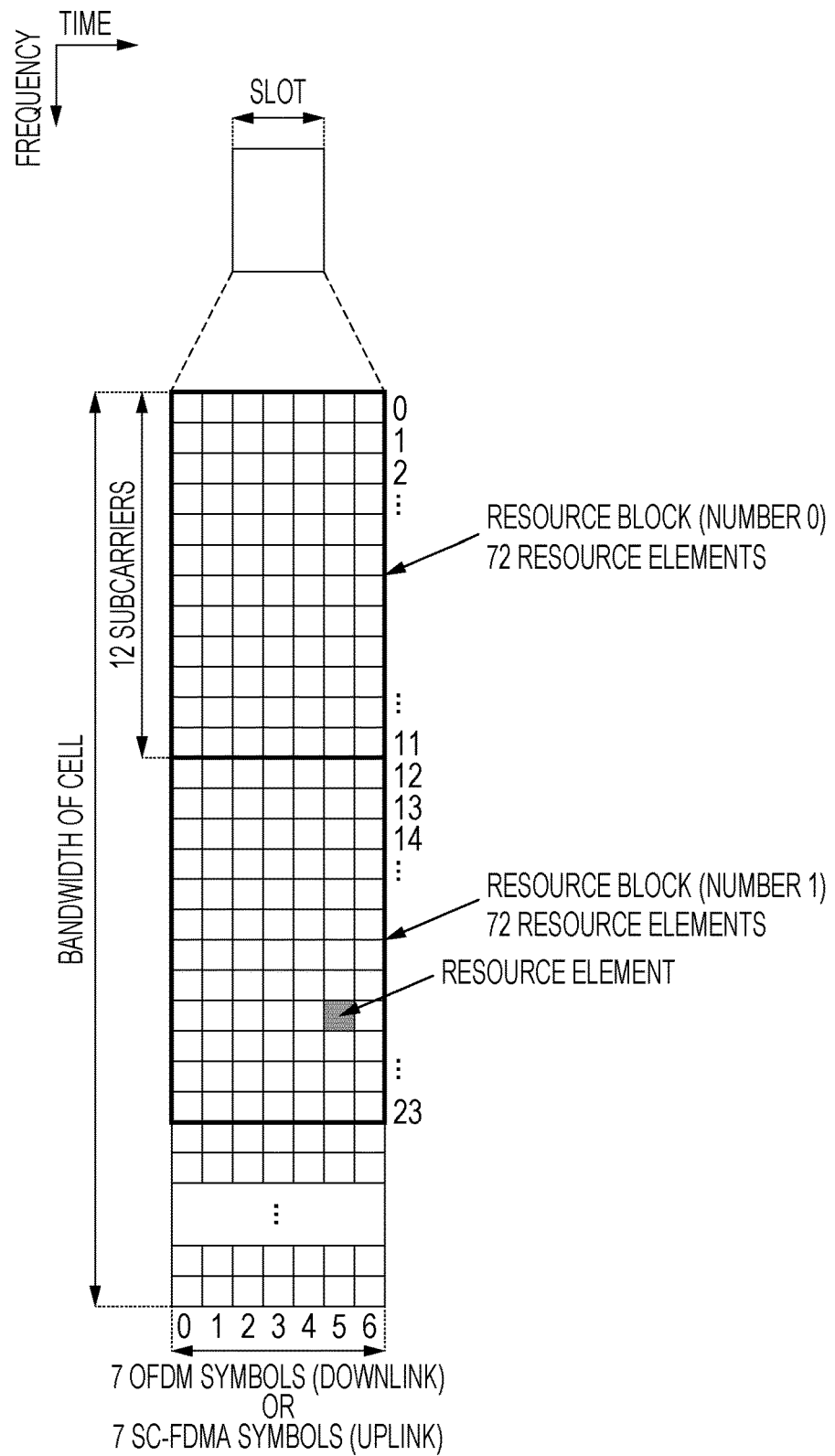
FIG. 3 is a diagram illustrating the structure of a slot.

FIG. 3 is a diagram illustrating the structure of the slot according to the embodiment. In FIG. 3, the horizontal axis is a time axis and the vertical axis is a frequency axis. In the embodiment, a normal CP (cyclic prefix) is applied to an OFDM symbol. Here, an extended CP (cyclic prefix) may also be applied to the OFDM symbol.

A physical signal or a physical channel transmitted in each slot is expressed by a resource grid. In a downlink, the resource grid is defined by a plurality of subcarriers and a plurality of OFDM symbols. In an uplink, the resource grid is defined by a plurality of subcarriers and a plurality of SC-FDMA symbols.

The number of subcarriers included in one slot depends on the bandwidth of a cell. For example, the number of OFDM symbols or SC-FDMA symbols included in one slot is 7. Here, each of the elements in the resource grid is referred to as a resource element. The resource element is identified using a subcarrier number and an OFDM symbol or SC-FDMA symbol number.

The resource block is used to express mapping to a resource element of a certain physical channel (PDSCH, PUSCH, or the like). For the resource blocks, a virtual resource block and a physical resource block are defined. A certain physical channel is first mapped to a virtual resource block. Thereafter, the virtual resource block is mapped to a physical resource block.

For example, one physical resource block is defined by 7 contiguous OFDM symbols or SC-FDMA symbols in a time region and 12 contiguous subcarriers in a frequency region. That is, one physical resource block includes (7×12) resource elements. One physical resource block corresponds to one slot in the time region and corresponds to 180 kHz in the frequency region. The physical resource block is numbered from 0 in the frequency region.

Hereinafter, the physical channels and the physical signals transmitted in the subframes will be described.

Figure 4:
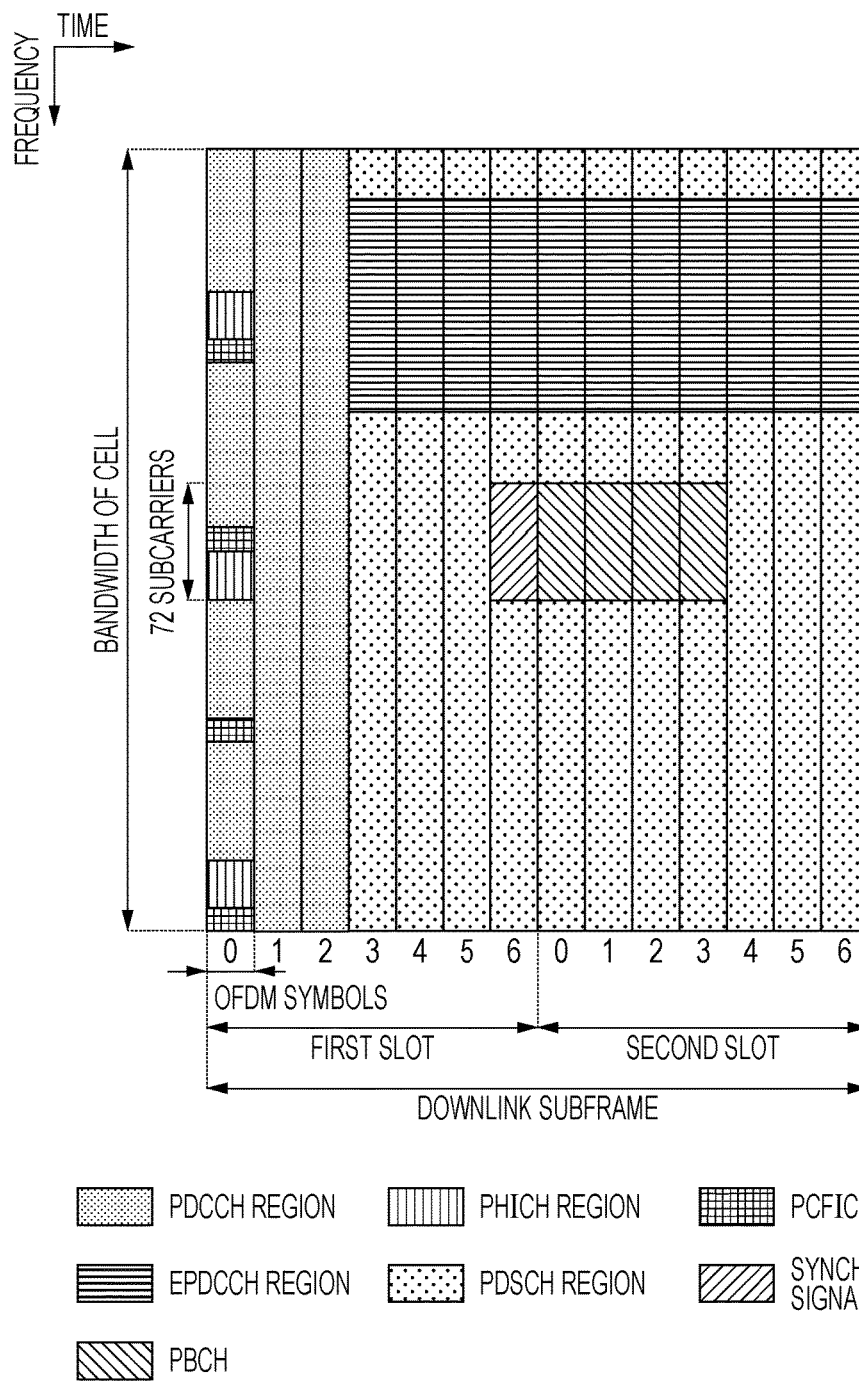
FIG. 4 is a diagram illustrating an example of arrangement of signals in a downlink subframe.

FIG. 4 is a diagram illustrating an example of arrangement of the physical channels and the physical signals in the downlink subframe according to the embodiment. In FIG. 4, the horizontal axis is a time axis and the vertical axis is a frequency axis. As illustrated in FIG. 4, the base station apparatus 3 may transmit the downlink physical channels (the PBCH, the PCFICH, the PHICH, the PDCCH, the EPDCCH, and the PDSCH) and the downlink physical signals (the synchronization signal and the downlink reference signal) in the downlink subframe. Here, to facilitate the description, the downlink reference signal is not illustrated in FIG. 4.

Here, in a PDCCH region, the plurality of PDCCHs may be subjected to frequency and time multiplexing. In an EPDCCH region, the plurality of EPDCCHs may be subjected to frequency, time, and spatial multiplexing. In a PDSCH area, the plurality of PDSCHs may be subjected to frequency and spatial multiplexing. The PDCCH and the PDSCH or EPDCCH may be subjected to time multiplexing. The PDSCH and the EPDCCH may be subjected to frequency multiplexing.

Here, the PDSCH (which may be the symbol of the PDSCH) used to transmit downlink data is mapped to the physical resource block assigned for transmission on the PDSCH in the downlink subframe. The PDSCH (which may be the symbol of the PDSCH) used to transmit downlink data is mapped from the OFDM symbol in which the mapping of the PDSCH starts to the last OFDM symbol in the downlink subframe.

For example, as illustrated in FIG. 4, the PDSCH is mapped to the resource elements corresponding to the 4th to 14th SC-FDMA symbols (symbols 3 to 6 of the first slot and symbols 0 to 6 of the second slot) in the downlink subframe. Here, as described above, the start position of the OFDM symbol at which the PDSCH is mapped may be indicated by the base station apparatus 3.

Figure 5:
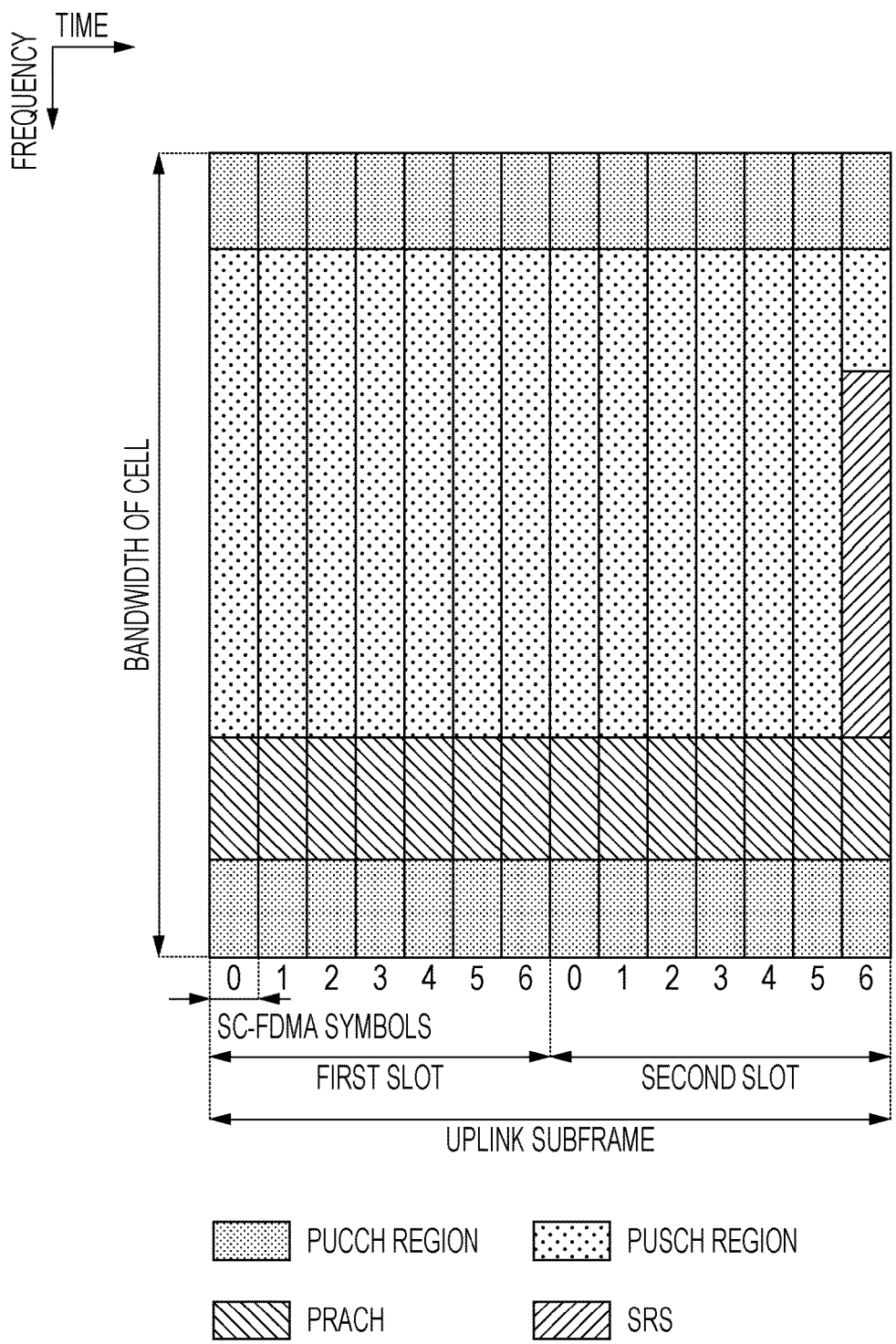
FIG. 5 is a diagram illustrating an example of arrangement of signals in an uplink subframe.

FIG. 5 is a diagram illustrating an example of arrangement of the physical channels and the physical signals in the uplink subframe according to the embodiment. In FIG. 5, the horizontal axis is a time axis and the vertical axis is a frequency axis. The terminal apparatus 1 may transmit the uplink physical channels (the PUCCH, the PUSCH, and the PRACH) and the uplink physical signals (the DMRS and the SRS) in the uplink subframe.

Here, in a PUCCH area, the plurality of PUCCHs are subjected to frequency, time, and code multiplexing. In a PUSCH area, the plurality of PUSCHs are subjected to frequency and spatial multiplexing. The PUCCH and the PUSCH may be subjected to frequency multiplexing. The PRACHs may be arranged in a single subframe or two subframes. The plurality of PRACHs may be subjected to code multiplexing.

The SRS is transmitted using the final SC-FDMA symbol in the uplink subframe. The terminal apparatus 1 may not simultaneously transmit the SRS and the PUCCH/PUSCH/PRACH in a single SC-FDMA symbol of a single cell. In the single uplink subframe of the single cell, the terminal apparatus 1 can transmit the PUSCH and/or the PUCCH using the SC-FDMA symbols excluding the final SC-FDMA symbol in this uplink subframe and can transmit the SRS using the final SC-FDMA symbol in this uplink subframe.

That is, the terminal apparatus 1 can transmit both of the SRS and the PUSCH/PUCCH in the single uplink subframe of the single cell. Here, the DMRS may be subjected to time multiplexing along with the PUCCH or the PUSCH. To simplify the description, the DMRS in FIG. 5 is not illustrated.

Figure 6:
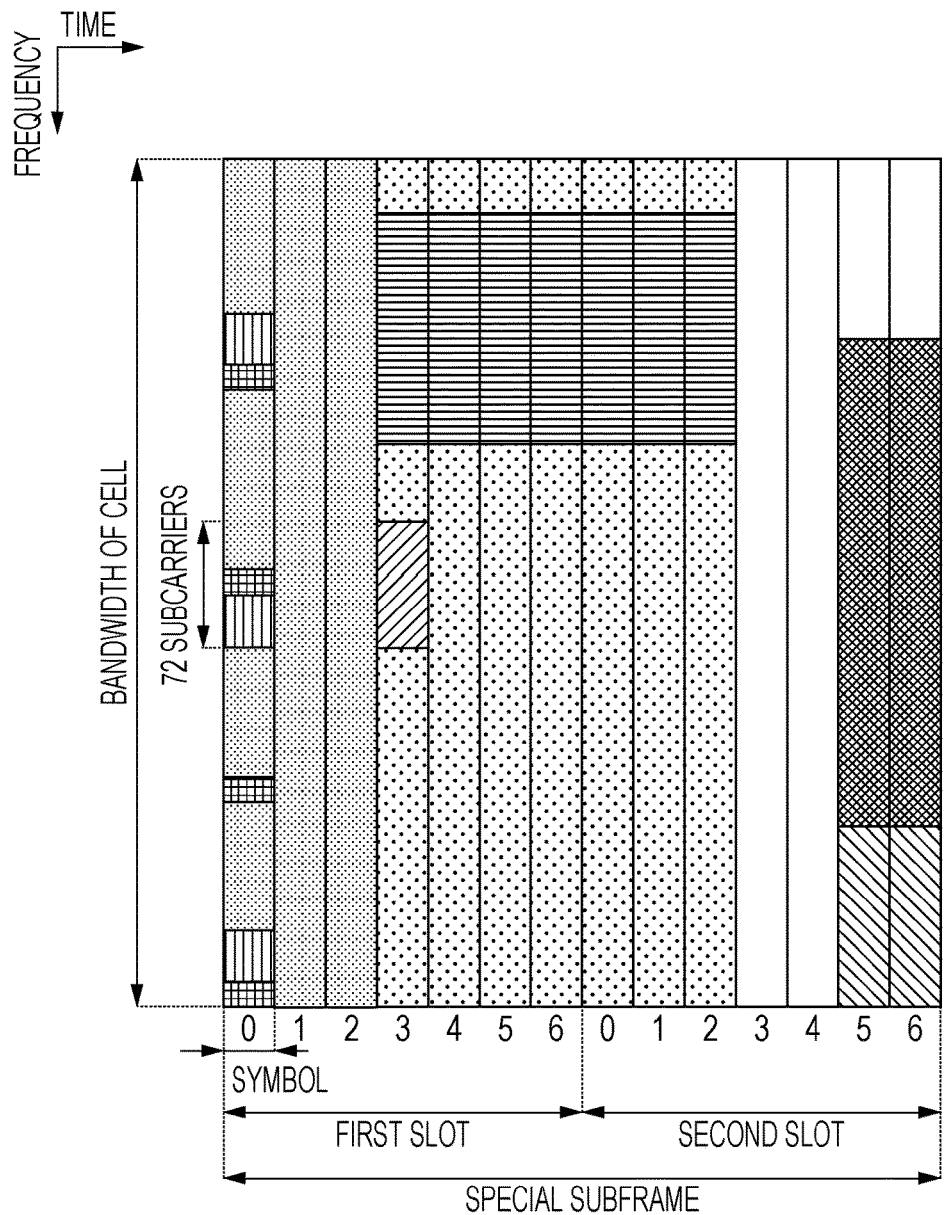
FIG. 6 is a diagram illustrating an example of arrangement of signals in a special subframe.

FIG. 6 is a diagram illustrating an example of arrangement of the physical channels and the physical signals in a special subframe according to the embodiment. In FIG. 6, the horizontal axis is a time axis and the vertical axis is a frequency axis.

For example, as illustrated in FIG. 6, the DwPTS is configured from 1st to 10th OFDMA symbols (OFDMA symbols 0 to 6 of the first slot and OFDMA symbols 0 to 2 of the second slot) in the special subframe. The GP is configured from a period corresponding to the 11th and 12th symbols (symbols 3 and 4 of the second slot) in the special subframe. The UpPTS is configured from the 13th and 14th SC-FDMA symbols (SC-FDMA symbol 5 and SC-FDMA symbol 6 of the second slot) in the special subframe.

The base station apparatus 3 may transmit the PCFICH, the PHICH, the PDCCH, the EPDCCH, the PDSCH, the synchronization signal, and the downlink reference signal in the DwPTS of the special subframe. The base station apparatus 3 does not transmit the PBCH in the DwPTS of the special subframe. The terminal apparatus 1 may transmit the PRACH and the SRS in the UpPTS of the special subframe. That is, the terminal apparatus 1 does not transmit the PUCCH, the PUSCH, and the DMRS in the UpPTS of the special subframe. Here, to facilitate the description, no downlink reference signal is illustrated in FIG. 6.

Here, the PDSCH (which may be the symbol of the PDSCH) used to transmit the downlink data is mapped to the physical resource block assigned for transmission on the PDSCH in the special subframe. The symbols of the PDSCH used to transmit the downlink data are mapped to only the DwPTS field (which may be the resource elements corresponding to the DwPTS field) in the special subframe. The PDSCH (which may be the symbol of the PDSCH) used to transmit the downlink data is mapped from the OFDM symbol in which the mapping of the PDSCH starts to the last OFDM symbol in the DwPTS in the special subframe.

That is, the PDSCH used to transmit the downlink data is not mapped to the GP field (which may be the resource element corresponding to the GP field) and the UpPTS field (which may be the resource element corresponding to the UpPTS field) in the special subframe.

For example, as illustrated in FIG. 6, the PDSCH is mapped to the resource elements corresponding to the 4th to 10th SC-FDMA symbols (symbols 3 to 6 of the first slot and symbols 0 to 2 of the second slot) in the downlink subframe. Here, as described above, the start position of the OFDM symbol at which the PDSCH is mapped may be indicated by the base station apparatus 3.

Hereinafter, a first uplink reference uplink-downlink configuration (UL reference UL-DL configuration), a first downlink reference uplink-downlink configuration (DL reference UL-DL configuration), a second UL reference UL-DL configuration, a second DL reference UL-DL configuration, and a third uplink-downlink configuration (UL-DL configuration) will be described.

Here, the third UL-DL configuration is also referred to as a signal of explicit layer 1 (Explicit L1 signaling). The third UL-DL configuration is also referred to as configuration of explicit layer 1 (Explicit L1 configuration).

For example, the first UL reference UL-DL configuration, the first DL reference UL-DL configuration, the second UL reference UL-DL configuration, the second DL reference UL-DL configuration, and the third UL-DL configuration are defined by uplink-downlink configurations (UL-DL configurations).

Here, the UL-DL configuration is configuration related to a pattern of the subframes in the radio frame. That is, the UL-DL configuration indicates that each of the subframes in the radio frame is one subframe of the downlink subframe, the uplink subframe, and the special subframe.

That is, the first UL reference UL-DL configuration, the second UL reference UL-DL configuration, the first DL reference UL-DL configuration, the second DL reference UL-DL configuration, and the third UL-DL configuration are defined by a pattern of the downlink subframe, the uplink subframe, and the special subframe in the radio frame.

For example, the pattern of the downlink subframe, the uplink subframe, and the special subframe indicates that each of subframes #0 to #9 is one of the downlink subframe, the uplink subframe, and the special subframe and is preferably expressed by any combination with a length 10 of D, U, and S (respectively representing the downlink subframe, the uplink subframe, and the special subframe). More preferably, the head (that is, subframe #0) is D and the second subframe (that is, subframe #1) is S.

FIG. 7 is a table illustrating an example of UL-DL configuration according to the embodiment. In FIG. 7, D represents the downlink subframe, U represents the uplink subframe, and S represents the special subframe.

Here, setting of UL-DL configuration i as the first or second UL reference UL-DL configuration is referred to as setting of first or second UL reference UL-DL configuration i. Setting of UL-DL configuration i as the first or second DL reference UL-DL configuration is referred to as setting of first or second DL reference UL-DL configuration i. Setting of UL-DL configuration i as the third UL-DL configuration is referred to as setting of third UL-DL configuration i.

Setting of UL-DL configuration i as the UL reference UL-DL configuration is referred to as setting of UL reference UL-DL configuration i. Setting of UL-DL configuration i as the DL reference UL-DL configuration is referred to as setting of DL reference UL-DL configuration i.

Hereinafter, methods of setting the first UL reference UL-DL configuration, the first DL reference UL-DL configuration, and the third UL-DL configuration will be described.

The base station apparatus 3 sets the first UL reference UL-DL configuration, the first DL reference UL-DL configuration, and the third UL-DL configuration.

The base station apparatus 3 may include first information (TDD-Config) indicating the first UL reference UL-DL configuration in at least one of an MIB, a system information block type 1 message, a system information message, an RRC message, a MAC CE (control element), and control information (for example, the DCI format) of the physical layer to transmit the first information to the terminal apparatus 1.

The base station apparatus 3 may include second information indicating the first DL reference UL-DL configuration in at least one of an MIB, a system information block type 1 message, a system information message, an RRC message, a MAC CE (control element), and control information (for example, the DCI format) of the physical layer to transmit the first information to the terminal apparatus 1.

The base station apparatus 3 may include third information indicating the third UL-DL configuration in at least one of an MIB, a system information block type 1 message, a system information message, an RRC message, a MAC CE (control element), and control information (for example, the DCI format) of the physical layer to transmit the first information to the terminal apparatus 1.

Here, for each of the plurality of serving cells, the first UL reference UL-DL configuration, the second UL reference UL-DL configuration, the first DL reference UL-DL configuration, the second DL reference UL-DL configuration, and the third UL-DL configuration may be defined.

That is, the base station apparatus 3 may transmit the first information, the second information, and the third information regarding each cell to the terminal apparatus 1 in which the plurality of cells are set. For each cell, the first information, the second information, and the third information may be set.

That is, the terminal apparatus 1 in which the plurality of cells are set may set the first UL reference UL-DL configuration, the first DL reference UL-DL configuration, and the third UL-DL configuration for each cell based on the first information, the second information, and the third information.

For example, the first information regarding the primary cell is preferably included in the system information block type 1 message or the RRC message. The first information regarding the secondary cell is preferably included in the RRC message.

The second information regarding the primary cell is preferably included in the system information block type 1 message, the system information message, or the RRC message. The second information regarding the secondary cell is preferably included in the RRC message. The third information is preferably included in the control information (for example, the DCI format) of the physical layer.

Figure 8:
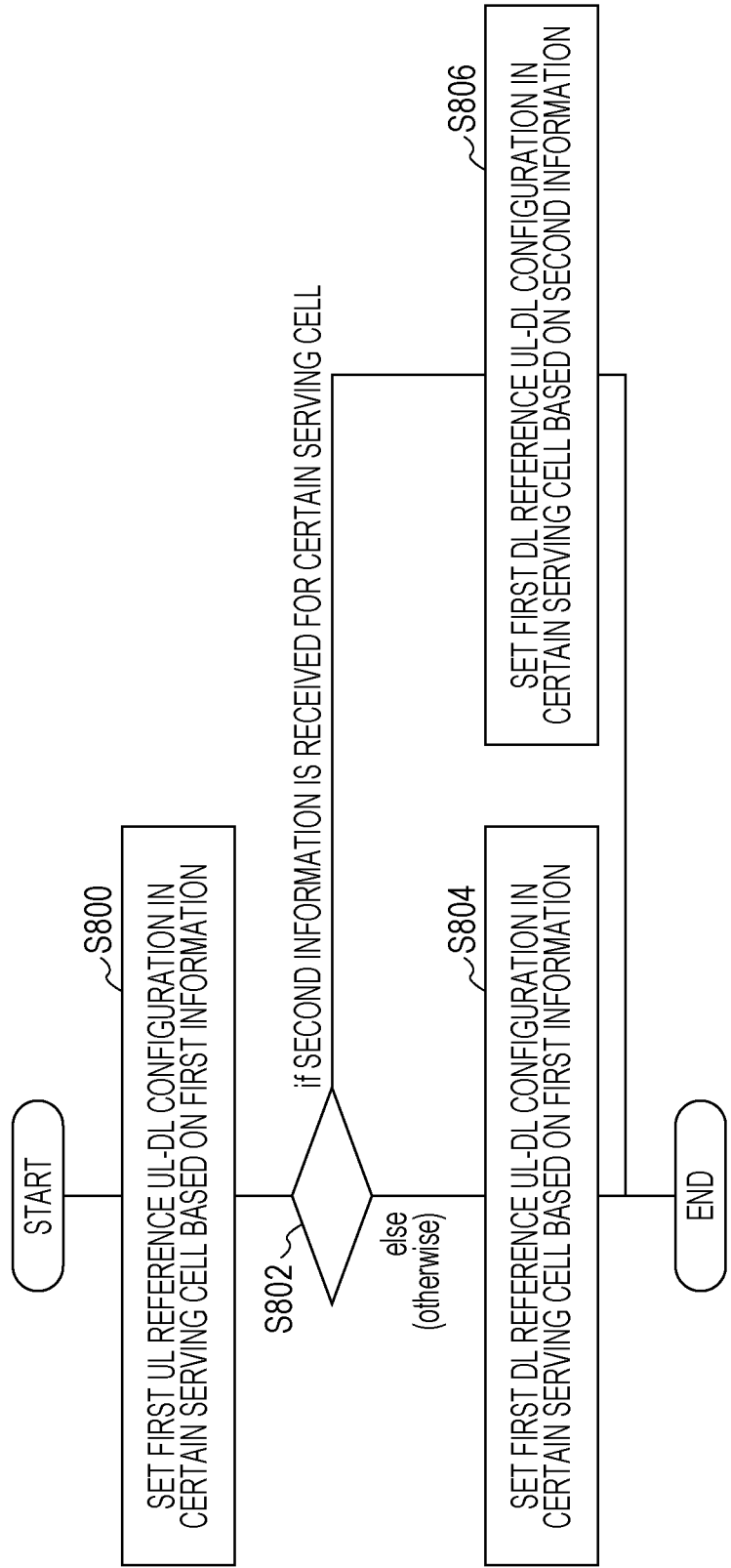
FIG. 8 is a flowchart illustrating a method of setting a first UL reference UL-DL configuration and a first DL reference UL-DL configuration.

FIG. 8 is a flowchart illustrating a method of setting the first UL reference UL-DL configuration and the first DL reference UL-DL configuration according to the embodiment. The terminal apparatus 1 may performs the setting method in FIG. 8 on each of the plurality of cells.

The terminal apparatus 1 sets the first UL reference UL-DL configuration in a certain cell based on the first information (S800). The terminal apparatus 1 determines whether the second information is received for the certain cell (S802). Here, when the terminal apparatus 1 receives the second information for the certain cell, the terminal apparatus 1 sets the first DL reference UL-DL configuration in the certain cell based on the second information regarding the certain cell (S806). When the terminal apparatus 1 does not receive the second information for the certain cell (else/otherwise), the terminal apparatus 1 sets the first DL reference UL-DL configuration in the certain cell based on the first information for the certain cell (S804).

Here, a cell for which the first UL reference UL-DL configuration and the first DL reference UL-DL configuration are set based on the first information is also referred to as a cell in which the dynamic TDD is not set. A cell for which the first DL reference UL-DL configuration is set based on the second information is also referred to as a cell in which the dynamic TDD is set.

When the second information for a certain cell is not received, the first UL reference UL-DL configuration and the first DL reference UL-DL configuration may not be defined. That is, when the terminal apparatus 1 does not receive the second information for a certain cell, one UL-DL configuration may be set for the certain cell based on the first information for the certain cell.

The terminal apparatus 1 receives the second information and determines the subframe in which uplink transmission is possible based on the second information. Next, the terminal apparatus 1 monitors the third information. When the terminal apparatus 1 receives the third information, the terminal apparatus 1 determines the subframe in which uplink transmission is possible based on the third information.

For example, the base station apparatus 3 may transmit the third information to the terminal apparatus 1 using the PDCCH/EPDCCH. That is, the third information may be used for the base station apparatus 3 (cell) to control an operation of the dynamic TDD within a coverage. Here, the third information may be transmitted and received in the CSS and/or the USS.

The terminal apparatus 1 tries to decode the received signal and determines whether the PDCCH/EPDCCH (which may be the DCI format) in which the third information is transmitted is detected. When the PDCCH/EPDCCH in which the third information is transmitted is detected, the terminal apparatus 1 determines the subframe in which the uplink transmission is possible based on the detected third information. When the PDCCH/EPDCCH in which the third information is transmitted is not detected, the terminal apparatus 1 determines may maintain the previous determination on the subframe in which the uplink transmission is possible.

Hereinafter, a method of setting the second UL reference UL-DL configuration will be described.

When the plurality of cells are set in the terminal apparatus 1 and the first UL reference UL-DL configuration is different between at least two cells, the base station apparatus 3 and the terminal apparatus 1 may set the second UL reference UL-DL configuration.

The base station apparatus 3 and the terminal apparatus 1 may not set the second UL reference UL-DL configuration except for a case where the plurality of cells are set in the terminal apparatus 1 and the first UL reference UL-DL configuration is different between at least two cells. Here, a case where the first UL reference UL-DL configuration is the same in the all serving cells (for example, two serving cells) may be included in "except for the case where the first UL reference UL-DL configuration is different between at least two serving cells".

The base station apparatus 3 and the terminal apparatus 1 may not set the second UL reference UL-DL configuration when (only) one cell is set in the terminal apparatus 1.

Figure 9:
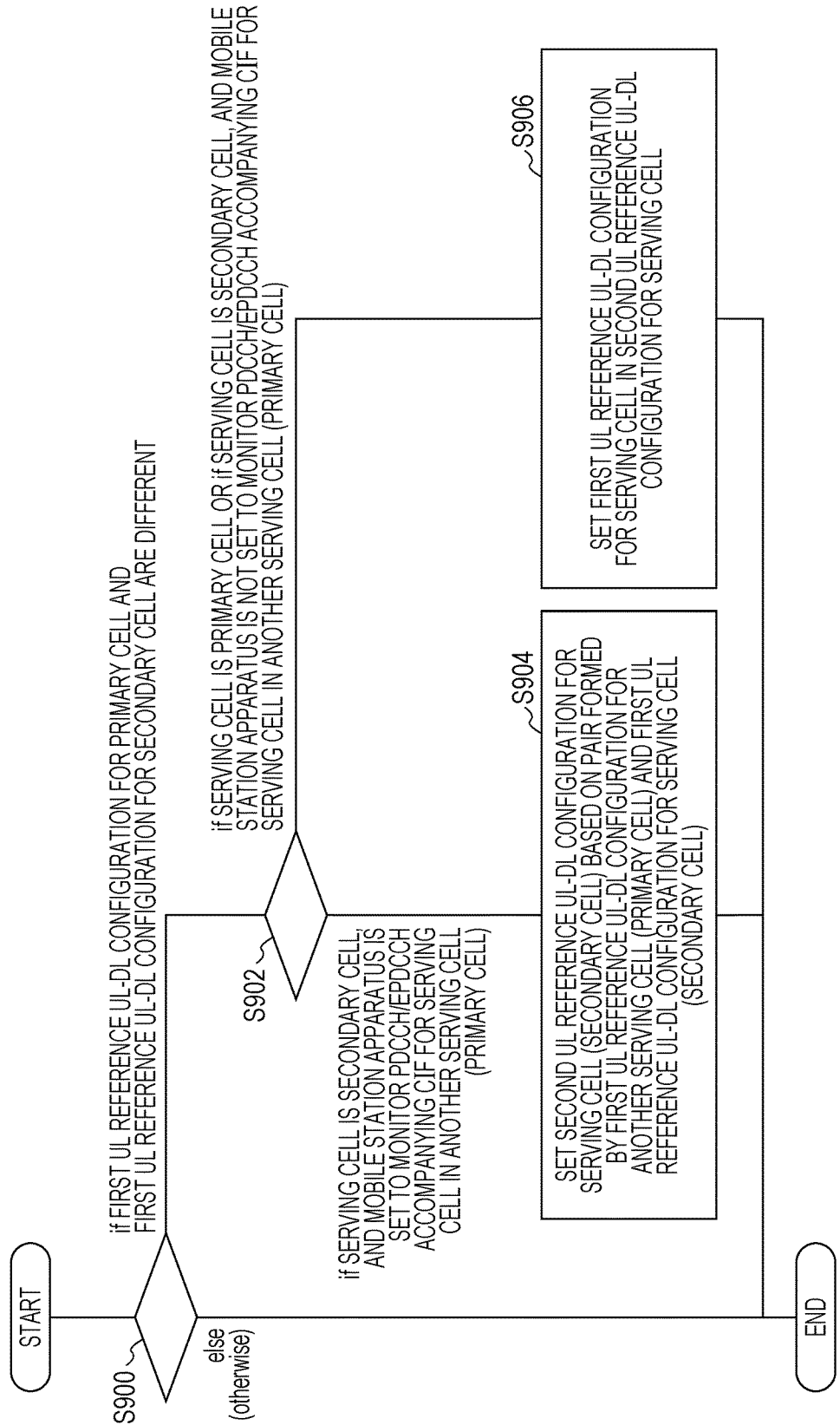
FIG. 9 is a flowchart illustrating a method of setting a second UL reference UL-DL configuration.

FIG. 9 is a flowchart illustrating the method of setting the second UL reference UL-DL configuration according to the embodiment. FIG. 9 illustrates a case in which one primary cell and one secondary cell are set in the terminal apparatus 1. Here, the terminal apparatus 1 may also perform the setting method in FIG. 9 on each of the primary cell and the secondary cell.

The terminal apparatus 1 determines whether the first UL reference UL-DL configuration for the primary cell and the first UL reference UL-DL configuration for the secondary cell are different (S900). Here, when the first UL reference UL-DL configuration for the primary cell and the first UL reference UL-DL configuration for the secondary cell are the same, the terminal apparatus 1 does not set the second UL reference UL-DL configuration and ends the process of setting the second UL reference UL-DL configuration.

When the first UL reference UL-DL configuration for the primary cell and the first UL reference UL-DL configuration for the secondary cell are different, the terminal apparatus 1 determines whether the serving cell is the primary cell or the secondary cell and/or the terminal apparatus 1 is set to monitor PDCCH/EPDCCH accompanying a CIF (Carrier Indicator Field) for the serving cell in another serving cell (S902).

Here, when the serving cell is the secondary cell and the terminal apparatus 1 is set to monitor the PDCCH/EPDCCH accompanying the CIF for the serving cell (the secondary cell) in another serving cell (that is, the primary cell), the second UL reference UL-DL configuration for the serving cell (secondary cell) is set based on a pair formed by the first UL reference UL-DL configuration for another serving cell (primary cell) and the first UL reference UL-DL configuration for the serving cell (secondary cell) (S904).

For example, in S904, the terminal apparatus 1 sets the second UL reference UL-DL configuration for the serving cell (secondary cell) based on the table of FIG. 10. FIG. 10 is a diagram illustrating the pair formed by the first UL reference UL-DL configuration for another serving cell (primary cell) and the first UL reference UL-DL configuration for the serving cell (secondary cell) and correspondence to the second UL reference UL-DL configuration for the secondary cell.

In FIG. 10, primary cell UL-DL configuration is performed with reference to the first UL reference UL-DL configuration for another serving cell (primary cell). Further, the secondary UL-DL configuration is performed with reference to the first UL reference UL-DL configuration for the serving cell (secondary cell).

For example, when first UL reference UL-DL configuration 0 is set for another serving cell (primary cell) and first UL reference UL-DL configuration 2 is set for the serving cell (secondary cell), second UL reference UL-DL configuration 1 is set for the secondary cell.

When the serving cell is the primary cell or the serving cell is the secondary cell and the terminal apparatus 1 is not set to monitor the PDCCH/EPDCCH accompanying the CIF for the serving cell (secondary cell) in another serving cell (the primary cell), the first UL reference UL-DL configuration for the serving cell is set in the second UL reference UL-DL configuration for the serving cell (S906).

Similarly, the base station apparatus 3 sets the second UL reference UL-DL configuration based on the setting method illustrated in FIG. 9.

Here, the monitoring of the PDCCH/EPDCCH accompanying the CIF includes a meaning that decoding of the PDCCH or the EPDCCH is tried according to the DCI format including the CIF. The CIF indicates a field to which the carrier indicator is mapped. The value of the carrier indicator indicates a serving cell to which the DCI format associated with the carrier indicator corresponds.

That is, in another serving cell, the terminal apparatus 1 set to monitor the PDCCH/EPDCCH accompanying the CIF to correspond to the serving cell monitors the PDCCH/EPDCCH accompanying the CIF in the other serving cell.

In another serving cell, the terminal apparatus 1 set to monitor the PDCCH/EPDCCH accompanying the CIF to correspond to the serving cell preferably receive the third information for the serving cell via the PDCCH/EPDCCH in the other serving cell.

In another serving cell, the terminal apparatus 1 not set to monitor the PDCCH/EPDCCH accompanying the CIF to correspond to the serving cell may monitor the PDCCH/EPDCCH accompanying the CIF or not accompanying the CIF in the other serving cell.

In another serving cell, the terminal apparatus 1 not set to monitor the PDCCH/EPDCCH accompanying the CIF to correspond to the serving cell preferably receive the third information for the serving cell via the PDCCH/EPDCCH in the other serving cell.

Here, the PDCCH/EPDCCH (which may be the DCI format) for the primary cell is transmitted in the primary cell. That is, the third information for the primary cell is preferably transmitted via the PDCCH/EPDCCH of the primary cell.

The base station apparatus 3 may transmit a parameter (cif-Presence-r10) indicating whether the DCI format transmitted in the primary cell includes the CIF to the terminal apparatus 1. The base station apparatus 3 may transmit a parameter (CrossCarrierSchedulingConfig-r10) associated with cross carrier scheduling in each secondary cell to the terminal apparatus 1.

Here, the parameter (CrossCarrierSchedulingConfig-r10) may include a parameter (schedulingCellInfo-r10) indicating whether the PDCCH/EPDCCH corresponding to the associated secondary cell is transmitted in the secondary cell or is transmitted in another serving cell.

When the parameter (schedulingCellInfo-r10) indicates that the PDCCH/EPDCCH corresponding to the associated secondary cell is transmitted in the secondary cell, the parameter (schedulingCellInfo-r10) may include the parameter (cif-Presence-r10) indicating whether the DCI format transmitted in the secondary cell includes the CIF.

When the parameter (schedulingCellInfo-r10) indicates that the PDCCH/EPDCCH corresponding to the associated secondary cell is transmitted in another serving cell, the parameter (schedulingCellInfo-r10) may include a parameter (schedulingCellId) indicating in which serving cell the downlink assignment or the uplink grant for the associated secondary cell is transmitted.

Hereinafter, a method of setting the second DL reference UL-DL configuration will be described.

For example, when the plurality of cells are set in the terminal apparatus 1 and the first DL reference UL-DL configuration is different between at least two cells, the base station apparatus 3 and the terminal apparatus 1 sets the second DL reference UL-DL configuration.

The base station apparatus 3 and the terminal apparatus 1 may not set the second DL reference UL-DL configuration except that the plurality of cells are set in the terminal apparatus 1 and the first DL reference UL-DL configuration is different between at least two cells. Here, the case in which the first DL reference UL-DL configuration is the same in the all serving cells (for example, two serving cells) may be included except that the first DL reference UL-DL configuration is different between at least two serving cells.

The base station apparatus 3 and the terminal apparatus 1 may not set the second DL reference UL-DL configuration when (only) one cell is set in the terminal apparatus 1.

Figure 11:
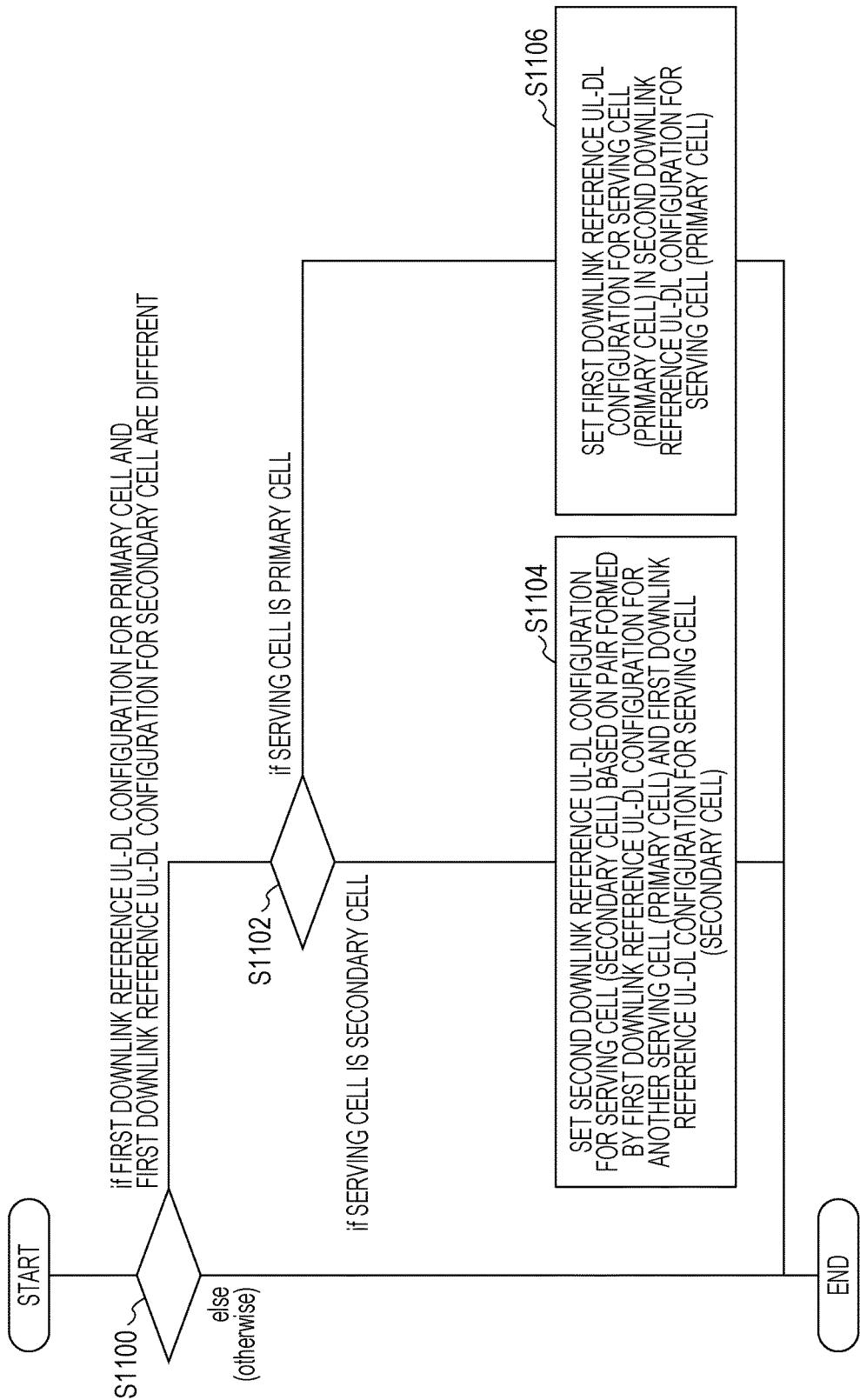
FIG. 11 is a flowchart illustrating a method of setting a second DL reference UL-DL configuration.

FIG. 11 is a flowchart illustrating a method of setting the second DL reference UL-DL configuration according to the embodiment. FIG. 11 illustrates a case in which one primary cell and one secondary cell are set in the terminal apparatus 1. The terminal apparatus 1 may performs the setting method in FIG. 11 on the primary cell and the secondary cell.

The terminal apparatus 1 determines whether the first DL reference UL-DL configuration for the primary cell and the first DL reference UL-DL configuration for the secondary cell are different (S1100). Here, when the first DL reference UL-DL configuration for the primary cell and the first DL reference UL-DL configuration for the secondary cell are the same, the terminal apparatus 1 does not set the second DL reference UL-DL configuration and ends the process of setting the second DL reference UL-DL configuration.

When the first DL reference UL-DL configuration for the primary cell and the first DL reference UL-DL configuration for the secondary cell are different, the terminal apparatus 1 determines whether the serving cell is the primary cell or the secondary cell (S1102).

Here, when the serving cell is the secondary cell, the second UL reference UL-DL configuration for the serving cell (secondary cell) is set based on a pair formed by the first DL reference UL-DL configuration for another serving cell (that is, the primary cell) and the first DL reference UL-DL configuration for the serving cell (secondary cell) (S1104).

For example, in S1104, the terminal apparatus 1 sets the second DL reference UL-DL configuration for the serving cell (secondary cell) based on the table of FIG. 12. FIG. 12 is a diagram illustrating the pair formed by the first DL reference UL-DL configuration for the primary cell and the first DL reference UL-DL configuration for the secondary cell and correspondence to the second DL reference UL-DL configuration for the secondary cell.

In FIG. 12, the primary cell UL-DL configuration is performed with reference to the first DL reference UL-DL configuration for the primary cell. The secondary cell UL-DL configuration is performed with reference to the first DL reference UL-DL configuration for the secondary cell.

For example, when the pair formed by the first DL reference UL-DL configuration for the primary cell and the first DL reference UL-DL configuration for the secondary cell belongs to set 1 in FIG. 12, the second DL reference UL-DL configuration for the secondary cell is defined in set 1.

For example, when the terminal apparatus 1 is not set to monitor the PDCCH/EPDCCH accompanying the CIF for the secondary cell in the primary cell and the pair formed by the first DL reference UL-DL configuration for the primary cell and the first DL reference UL-DL configuration for the primary cell and the first DL reference UL-DL configuration for the secondary cell belongs to set 2 in FIG. 12, the second DL reference UL-DL configuration for the secondary cell is defined in set 2.

When first DL reference UL-DL configuration 1 is set for the primary cell and first DL reference UL-DL configuration 0 is set for the secondary cell, second DL reference UL-DL configuration 1 is set for the secondary cell.

When the serving cell is the primary cell, the first DL reference UL-DL configuration for the serving cell (primary cell) is set in the second DL reference UL-DL configuration for the serving cell (primary cell) (S1106).

Similarly, the base station apparatus 3 sets the second DL reference UL-DL configuration based on the setting method illustrated in FIG. 11.

Hereinafter, the first UL reference UL-DL configuration will be described.

The first UL reference UL-DL configuration is used at least to specify the subframe in which uplink transmission is possible or may not be possible in a cell. Here, 'specifying' to be described below includes meanings of at least "deciding," "selecting", and "indicating".

For example, the terminal apparatus 1 does not perform uplink transmission in the subframe indicated as the downlink subframe using the first UL reference UL-DL configuration. The terminal apparatus 1 does not perform uplink transmission in the DwPTS and the GP of the subframe indicated as the special subframe using the first UL reference UL-DL configuration.

Hereinafter, the first DL reference UL-DL configuration will be described.

The first DL reference UL-DL configuration is used at least to specify the subframe in which downlink transmission is possible or may not be possible in a cell.

For example, the terminal apparatus 1 does not perform downlink transmission in the subframe indicated as the uplink subframe using the first DL reference UL-DL configuration. The terminal apparatus 1 does not perform downlink transmission in the UpPTS and the GP of the subframe indicated as the special subframe using the first DL reference UL-DL configuration.

The terminal apparatus 1 setting the first DL reference UL-DL configuration based on the first information may perform measurement (for example, measurement related to channel state information) using a downlink signal in the DwPTS of the special subframe or the downlink subframe indicated using the first UL reference UL-DL configuration or the first DL reference UL-DL configuration.

Here, the subframe indicated as the uplink subframe using the first UL reference UL-DL configuration and indicated as the downlink subframe using the first DL reference UL-DL configuration is also referred to as a first flexible subframe. The first flexible subframe may be a subframe reserved for uplink transmission and downlink transmission.

The subframe indicated as the special subframe using the first UL reference UL-DL configuration and indicated as the downlink subframe using the first DL reference UL-DL configuration is also referred to as a second flexible subframe. The second flexible subframe may be a subframe reserved for downlink transmission. The second flexible subframe may be a subframe reserved for downlink transmission in the DwPTS and for uplink transmission in the UpPTS.

The subframe indicated as the uplink subframe using the first UL reference UL-DL configuration and indicated as the uplink subframe using the first DL reference UL-DL configuration is also referred to as a fixed uplink subframe. The fixed uplink subframe is reserved for uplink transmission.

Hereinafter, the third UL-DL configuration will be described.

The base station apparatus 3 and the terminal apparatus 1 set the third UL-DL configuration related to transmission directions (up/down) in the subframe. For example, the third UL-DL configuration is used to specify the transmission direction in the subframe. The third UL-DL configuration may be used for the first UL reference UL-DL configuration and the first DL reference UL-DL configuration and may be used to specify a transmission direction in the subframe indicated as another subframe.

That is, the terminal apparatus 1 controls the transmission of the first flexible subframe and the second flexible subframe based on scheduling information (the DCI format and/or the HARQ-ACK) and the third UL-DL configuration.

For example, the third information indicating the third UL-DL configuration may be information for indicating the subframe in which uplink transmission is possible. The third information indicating the third UL-DL configuration may also be information for indicating the subframe in which downlink transmission is possible. The third information indicating the third UL-DL configuration may be information for indicating the subframe in which uplink transmission in the UpPTS and downlink transmission in the DwPTS are possible.

The base station apparatus 3 may schedule downlink transmission in the subframe indicated as the downlink subframe using the third UL-DL configuration. The terminal apparatus 1 may perform a downlink reception process in the subframe indicated as the downlink subframe using the third UL-DL configuration.

The base station apparatus 3 may also schedule uplink transmission in the subframe indicated as the uplink subframe using the third UL-DL configuration. The terminal apparatus 1 may perform an uplink transmission process in the subframe indicated as the uplink subframe using the third UL-DL configuration.

The base station apparatus 3 may schedule downlink transmission in the DwPTS of the subframe indicated as the special subframe using the third UL-DL configuration. The terminal apparatus 1 may perform a downlink reception process in the DwPTS of the subframe indicated as the special subframe using the third UL-DL configuration.

Here, the third UL-DL configuration may be used to indicate (notify) the downlink subframe in which the terminal apparatus monitors the PDCCH and/or the EPDCCH. The third UL-DL configuration (the third information) may be used to indicated (notify) the downlink subframe (the downlink subframe in which the channel state information can be measured) in which the terminal apparatus measures the channel state information.

Hereinafter, the first UL reference UL-DL configuration and the second UL reference UL-DL configuration will be described.

The first UL reference UL-DL configuration and the second UL reference UL-DL configuration may be used to specify correspondence between a subframe n in which the PDCCH/EPDCCH/PHICH are arranged and a subframe n+k in which the PUSCHs corresponding to the PDCCH/EPDCCH/PHICH are arranged.

For example, when one primary cell is set or when one primary cell and one secondary cell are set and the first UL reference UL-DL configuration for the primary cell and the first UL reference UL-DL configuration for the secondary cell are the same, the corresponding first UL reference UL-DL configuration is used in two serving cells to specify correspondence between the subframe in which the PDCCH/EPDCCH/PHICH are arranged and the subframe in which the PUSCHs corresponding to the PDCCH/EPDCCH/PHICH are arranged.

When one primary cell and one secondary cell are set and the first UL reference UL-DL configuration for the primary cell and the first UL reference UL-DL configuration for the secondary cell are different, the corresponding second UL reference UL-DL configuration is used in two serving cells to specify correspondence between the subframe in which the PDCCH/EPDCCH/PHICH are arranged and the subframe in which the PUSCHs corresponding to the PDCCH/EPDCCH/PHICH are arranged.

FIG. 13 is a diagram illustrating correspondence between subframe n in which the PDCCH/EPDCCH/PHICH are arranged and subframe n+k in which the PUSCHs corresponding to the PDCCH/EPDCCH/PHICH are arranged according to the embodiment. The terminal apparatus 1 specifies the value of k with reference to the table of FIG. 13.

In FIG. 13, when one primary cell is set or when one primary cell and one secondary cell are set and the first UL reference UL-DL configuration for the primary cell and the first UL reference UL-DL configuration for the secondary cell are the same, the first UL reference UL-DL configuration is referred as the UL reference UL-DL configuration.

When one primary cell and one secondary cell are set and the first UL reference UL-DL configuration for the primary cell and the first UL reference UL-DL configuration for the secondary cell are different, the second UL reference UL-DL configuration is referred as the UL reference UL-DL configuration.

Hereinafter, in the description of FIG. 13, the first UL reference UL-DL configuration and the second UL reference UL-DL configuration are simply referred to as the UL-DL configurations.

For example, when the terminal apparatus 1 detects the PDCCH/EPDCCH with the uplink grant targeting the terminal apparatus 1 for the cell in UL-DL configurations 1 to 6 are set in subframe n, the terminal apparatus 1 performs transmission on the PUSCH corresponding to the uplink grant in subframe n+k specified based on the table of FIG. 13.

When the terminal apparatus 1 detects the PHICH accompanying the NACK that targets the terminal apparatus 1 in subframe n for the cell in which UL-DL configurations 1 to 6 are set, the terminal apparatus 1 performs transmission on the PUSCH in subframe n+k specified based on the table of FIG. 13.

The uplink grant targeting the terminal apparatus 1 includes a 2-bit uplink index (UL index) for the cell in which UL-DL configuration 0 is set. The uplink grant targeting the terminal apparatus 1 does not include a 2-bit uplink index (UL index) for the cell in which UL-DL configurations 1 to 6 are set.

When the MSB (most significant bit) of the uplink index included in the uplink grant corresponding to the cell in which UL-DL configuration 0 is set is set to 1 in subframe n, the terminal apparatus 1 performs transmission on the PUSCH corresponding to the uplink grant in subframe n+k specified based on the table of FIG. 13 (adjusts the transmission on the PUSCH).

When the PHICH accompanying the NACK corresponding to the cell in which UL-DL configuration 0 is set is received in a first resource set in subframe n=0 or 5, the terminal apparatus 1 performs the transmission on the PUSCH according to the PHICH in subframe n+k specified based on the table of FIG. 13.

When the LSB (least significant bit) of the uplink index included in the uplink grant corresponding to the cell in which UL-DL configuration 0 is set is set to 1 in subframe n, the terminal apparatus 1 performs transmission on the PUSCH corresponding to the uplink grant in subframe n+7.

When the PHICH accompanying the NACK corresponding to the cell in which UL-DL configuration 0 is set is received in a second resource set in subframe n=0 or 5, the terminal apparatus 1 performs the transmission on the PUSCH corresponding to the uplink grant in subframe n+7.

When the PHICH accompanying the NACK corresponding to the cell in which UL-DL configuration 0 is set is received in subframe n=1 or 6, the terminal apparatus 1 performs the transmission on the PUSCH corresponding to the uplink grant in subframe n+7.

For example, when the terminal apparatus 1 detects the PDCCH/EPDCCH/PHICH corresponding to the cell in which the UL-DL configuration 0 is set in [SFN=m, subframe 1], the terminal apparatus 1 performs the transmission of the PUSCH in the subframe [SFN=m, subframe 7] located later by 6 subframes.

The first UL reference UL-DL configuration and the second UL reference UL-DL configuration may be used to specify the correspondence between subframe n in which the PUSCH is arranged and subframe n+k in which the PHICH corresponding to the PUSCH is arranged.

That is, for example, when one primary cell is set or when one primary cell and one secondary cell are set and the first UL reference UL-DL configuration for the primary cell and the first UL reference UL-DL configuration for the secondary cell are the same, the corresponding first UL reference UL-DL configuration is used in two serving cells to specify the correspondence between subframe n in which the PUSCH is arranged and subframe n+k in which the PHICH corresponding to the PUSCH is arranged.

When one primary cell and one secondary cell are set and the first UL reference UL-DL configuration for the primary cell and the first UL reference UL-DL configuration for the secondary cell are different, the corresponding second UL reference UL-DL configuration is used in two serving cells to specify the correspondence between subframe n in which the PUSCH is arranged and subframe n+k in which the PHICH corresponding to the PUSCH is arranged.

FIG. 14 is a diagram illustrating correspondence between subframe n in which the PUSCH is arranged and subframe n+k in which the PUSCH corresponding to the PHICH is arranged according to the embodiment. The terminal apparatus 1 specifies the value of k with reference to the table of FIG. 14.

In FIG. 14, when one primary cell is set or when one primary cell and one secondary cell are set and the first UL reference UL-DL configuration for the primary cell and the first UL reference UL-DL configuration for the secondary cell are the same, the first UL reference UL-DL configuration is referred as the UL reference UL-DL configuration.

When one primary cell and one secondary cell are set and the first UL reference UL-DL configuration for the primary cell and the first UL reference UL-DL configuration for the secondary cell are different, the second UL reference UL-DL configuration is referred as the UL reference UL-DL configuration.

Hereinafter, in the description of FIG. 14, the first UL reference UL-DL configuration and the second UL reference UL-DL configuration are simply referred to as the UL-DL configurations.

When the transmission on the PUSCH is scheduled in subframe n, the terminal apparatus 1 specifies the PHICH resource in subframe n+k specified from the table of FIG. 14.

For example, when the transmission on the PUSCH is scheduled in [SFN=m, subframe n=2] in the cell in which UL-DL configuration 0 is set, the PHICH resource in [SFN=m, subframe n=6] is specified.

Hereinafter, the first DL reference UL-DL configuration and the second DL reference UL-DL configuration will be described.

The first DL reference UL-DL configuration and the second DL reference UL-DL configuration are used to specify the correspondence between subframe n in which the PDSCH is arranged and subframe n+k in which the HARQ-ACK corresponding to the PDSCH is transmitted.

For example, when one primary cell is set or when one primary cell and one secondary cell are set and the first DL reference UL-DL configuration for the primary cell and the first DL reference UL-DL configuration for the secondary cell are the same, the corresponding first DL reference UL-DL configuration is used in two serving cells to specify the correspondence between subframe n in which the PDSCH is arranged and subframe n+k in which the HARQ-ACK corresponding to the PDSCH is transmitted.

When one primary cell and one secondary cell are set and the first DL reference UL-DL configuration for the primary cell and the first DL reference UL-DL configuration for the secondary cell are different, the corresponding second DL reference UL-DL configuration is used in two serving cells to specify the correspondence between subframe n in which the PDSCH is arranged and subframe n+k in which the HARQ-ACK corresponding to the PDSCH is transmitted.

FIG. 15 is a diagram illustrating correspondence between subframe n−k in which the PDSCH is arranged and subframe n in which the HARQ-ACK corresponding to the PDSCH is transmitted according to the embodiment. The terminal apparatus 1 specifies the value of k with reference to the table of FIG. 15.

In FIG. 15, when one primary cell is set or when one primary cell and one secondary cell are set and the first DL reference UL-DL configuration for the primary cell and the first DL reference UL-DL configuration for the secondary cell are the same, the first DL reference UL-DL configuration is referred as the DL reference UL-DL configuration.

When one primary cell and one secondary cell are set and the first DL reference UL-DL configuration for the primary cell and the first DL reference UL-DL configuration for the secondary cell are different, the second DL reference UL-DL configuration is referred as the DL reference UL-DL configuration.

Hereinafter, in the description of FIG. 15, the first DL reference UL-DL configuration and the second DL reference UL-DL configuration are simply referred to as the UL-DL configurations.

When the terminal apparatus 1 is a target in subframe n−k (where k is specified by the table of FIG. 15) of the serving cell and the transmission of the PDSCH in which the corresponding HARQ-ACK is to be transmitted is detected, the terminal apparatus 1 transmits the HARQ-ACK in subframe n.

Here, for example, the terminal apparatus 1 does not respond to the HARQ-ACK to the transmission of the PDSCH used for transmission of the system information. Further, the terminal apparatus 1 responds to the HARQ-ACK to the transmission of the PDSCH scheduled by the DCI format accompanying the CRC scrambled by the C-RNTI.

The terminal apparatus 1 transmits the HARQ-ACK in subframe n=2 in response to the PDSCH received in subframe n−6 and/or n−7 in the cell in which UL-DL configuration 1 is set.

Here, when the second information is not received, the first DL reference UL-DL configuration may not be defined. In this case, based on the first DL reference UL-DL configuration (serving cell UL-DL configuration), the terminal apparatus 1 and the base station apparatus 3 may perform a process performed based on the above-described first DL reference UL-DL configuration.

For example, when one primary cell and one secondary cell are set, the second information for the secondary cell is not received, the second information for the primary cell is received, the second information for the secondary cell is received, the first UL reference UL-DL configuration (the serving cell UL-DL configuration) for the secondary cell and the first DL reference UL-DL configuration for the primary cell are different, and the serving cell is the secondary cell, the second DL reference UL-DL configuration for the serving cell (secondary cell) may be set based on the pair formed by the first DL reference UL-DL configuration for another serving cell (primary cell) and the first UL reference UL-DL configuration for the serving cell (secondary cell).

For example, when one primary cell and one secondary cell are set, the second information for the primary cell is not received, the second information for the secondary cell is received, the second information for the secondary cell is received, the first UL reference UL-DL configuration (the serving cell UL-DL configuration) for the primary cell and the first DL reference UL-DL configuration for the secondary cell are different, and the serving cell is the secondary cell, the second DL reference UL-DL configuration for the serving cell (secondary cell) may be set based on the pair formed by the first UL reference UL-DL configuration for another serving cell (primary cell) and the first DL reference UL-DL configuration for the serving cell (secondary cell).

For example, when one primary cell and one secondary cell are set, the second information for the primary cell is not received, the second information for the secondary cell is received, and the second information for the secondary cell is received, and the first UL reference UL-DL configuration (the serving cell UL-DL configuration) for the primary cell and the first DL reference UL-DL configuration for the secondary cell are different, the corresponding second DL reference UL-DL configuration may be used in two serving cells to specify the correspondence between subframe n in which the PDSCH is arranged and subframe n+k in which the HARQ-ACK corresponding to the PDSCH is transmitted.

For example, when one primary cell and one secondary cell are set, the second information for the primary cell is not received, the second information for the secondary cell is received, and the first UL reference UL-DL configuration (the serving cell UL-DL configuration) for the primary cell and the first DL reference UL-DL configuration for the secondary cell are the same, the corresponding first UL reference UL-DL configuration (the serving cell UL-DL configuration) may be used in the primary cell to specify the correspondence between subframe n in which the PDSCH is arranged and subframe n+k in which the HARQ-ACK corresponding to the PDSCH is transmitted. Further, the corresponding first DL reference UL-DL configuration may be used in the secondary cell to specify correspondence between subframe n in which the PDSCH is arranged and subframe n+k in which the HARQ-ACK corresponding to the PDSCH is transmitted.

For example, when one primary cell and one secondary cell are set, the second information for the primary cell is not received, the second information for the secondary cell is received, the first UL reference UL-DL configuration (the serving cell UL-DL configuration) for the primary cell and the first DL reference UL-DL configuration for the secondary cell are different, the primary cell UL-DL configuration may be performed with reference to the first UL reference UL-DL configuration for the primary cell in FIGS. 10 and 12.

Here, the second UL reference UL-DL configuration and the second DL reference UL-DL configuration may not be set in the serving sell in which the first DL reference UL-DL configuration is set.

Hereinafter, a method of transmitting and receiving downlink data will be described.

In the following description, the first UL reference UL-DL configuration and the second UL reference UL-DL configuration are collectively also referred to as the UL reference UL-DL configurations. The first DL reference UL-DL configuration and the second DL reference UL-DL configuration are collectively also referred to as the DL reference UL-DL configurations.

Here, when the first UL reference UL-DL configuration is set and the second UL reference UL-DL configuration is not set, the UL reference UL-DL configuration may be the first UL reference UL-DL configuration. When the first UL reference UL-DL configuration is set and the second UL reference UL-DL configuration is set, the UL reference UL-DL configuration may be set the first UL reference UL-DL configuration. When the first reference UL-DL configuration is set and the second UL reference UL-DL configuration is set, the UL reference UL-DL configuration may be the second UL reference UL-DL configuration.

When the first DL reference UL-DL configuration is set and the second DL reference UL-DL configuration is not set, the DL reference UL-DL configuration may be the first DL reference UL-DL configuration. When the first DL reference UL-DL configuration is set and the second DL reference UL-DL configuration is set, the DL reference UL-DL configuration may be the first DL reference UL-DL configuration. When the first DL reference UL-DL configuration is set and the second DL reference UL-DL configuration is set, the DL reference UL-DL configuration may be the second DL reference UL-DL configuration.

When the DCI format is detected in a certain frame, the terminal apparatus 1 may decode the PDSCH scheduled using the DCI format in the same subframe as the certain subframe. That is, the terminal apparatus 1 may decode the PDSCH corresponding to the DCI format in the same subframe as the certain subframe based on detection of the DCI format in the certain frame.

Here, the terminal apparatus 1 may assume the certain subframe as the downlink subframe and decode the PDSCH. When the terminal apparatus 1 assumes the certain subframe as the downlink subframe, the terminal apparatus 1 may at least assume that the GP field and the UpPTS field are not included in the certain subframe and decode the PDSCH.

That is, when the terminal apparatus 1 assumes the certain subframe as the downlink subframe, the terminal apparatus 1 may at least assume that the PDSCH is mapped to the physical resource block assigned to perform the transmission on the PDSCH and decode the PDSCH. That is, the terminal apparatus 1 may assume that the PDSCH (which may be the symbol of the PDSCH) used to transmit the downlink data is mapped from the OFDM symbol in which the mapping of the PDSCH starts to the final OFDM symbol in the certain subframe by the base station apparatus 3 and decode the PDSCH.

For example, the terminal apparatus 1 may assume that the PDSCH (which may be the symbol of the PDSCH) is mapped to the 4th to 14th resource elements in the downlink subframe, as illustrated in FIG. 4, and decode the PDSCH.

The terminal apparatus 1 may assume a certain subframe as the special subframe and decode the PDSCH. When the terminal apparatus 1 assumes the certain subframe as the special subframe, the terminal apparatus 1 may at least assume that the GP field and the UpPTS field are included in the certain subframe and decode the PDSCH.

That is, when the terminal apparatus 1 assumes the certain subframe as the special subframe, the terminal apparatus 1 may at least assume that the PDSCH is mapped to the physical resource block assigned to perform the transmission on the PDSCH and decode the PDSCH.

Further, when the terminal apparatus 1 assumes a certain subframe as the special subframe, the terminal apparatus 1 may at least assume that the PDSCH (which may be the symbol of the PDSCH) is mapped to only the DwPTS field (which may be the resource element corresponding to the DwPTS field) and decode the PDSCH. That is, the terminal apparatus 1 may assume that the PDSCH (which may be the symbol of the PDSCH) used to transmit the downlink data is mapped to the OFDM symbol in which the mapping of the PDSCH starts to the last OFDM symbol in the DwPTS in the certain subframe by the base station apparatus 3 and decode the PDSCH.

When the terminal apparatus 1 assumes a certain subframe as the special subframe, the terminal apparatus 1 may at least assume that the PDSCH (which may be the symbol of the PDSCH) is not mapped to the GP field (which may be the resource element corresponding to the GP field) and the UpPTS field (which may be the resource element corresponding to the UpPTS) and decode the PDSCH.

For example, the terminal apparatus 1 may assume that the PDSCH (which may be the symbol of the PDSCH) is mapped to the 4th to 10th resource elements in the downlink subframe, as illustrated in FIG. 6, and decode the PDSCH.

In the following description of FIGS. 16 and 17, the DCI format to which the CRC parity bits scrambled by the C-RNTI, the SPS C-RNTI, the RA-RNTI, the P-RNTI, or the SI-RNTI are attached is simply referred to as the DCI format. As described above, the DCI format used to schedule the PDSCH may include DCI format 1a and DCI format 1C.

Figure 16:
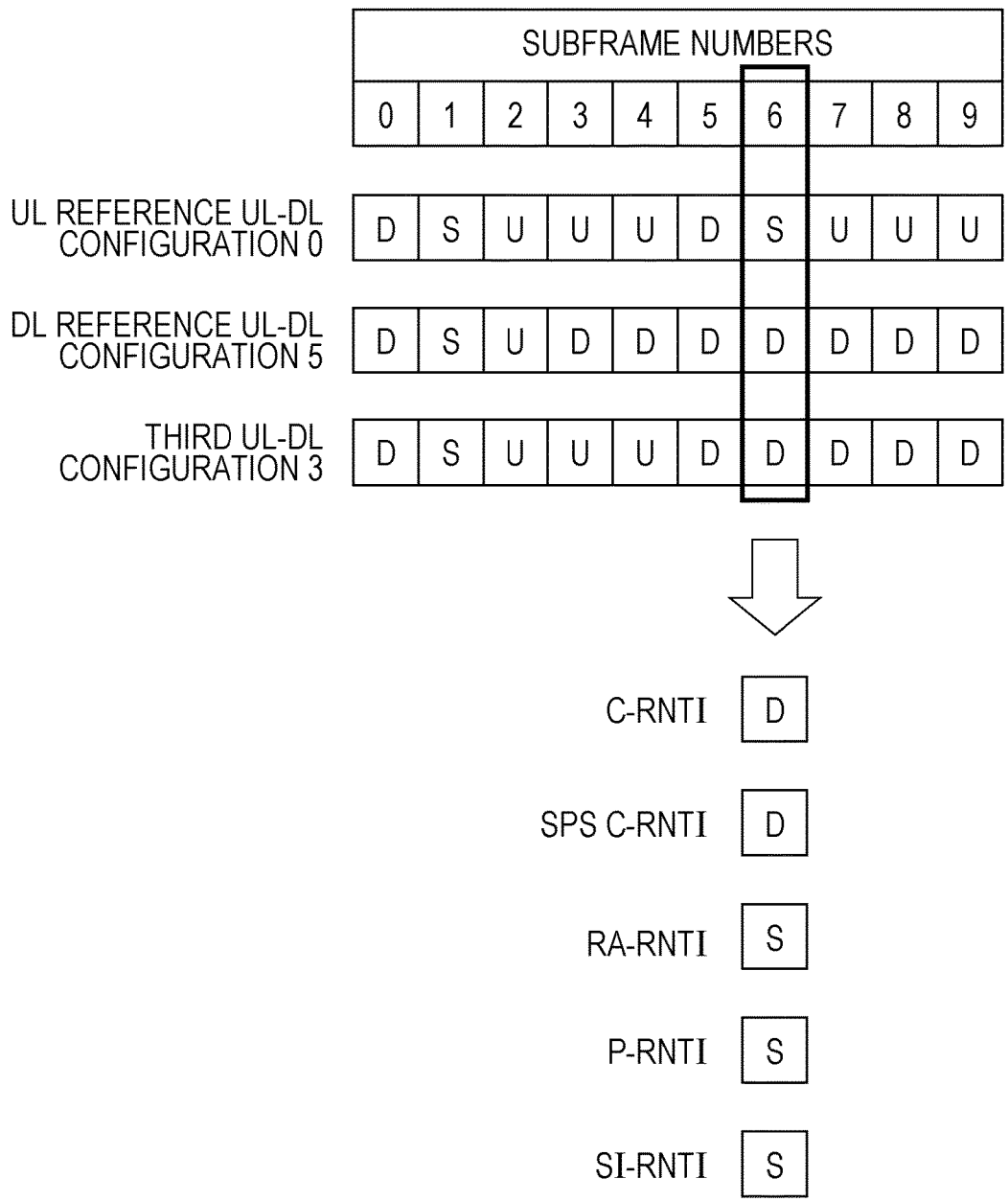
FIG. 16 is a diagram illustrating a method of transmitting and receiving downlink data.
Figure 17:
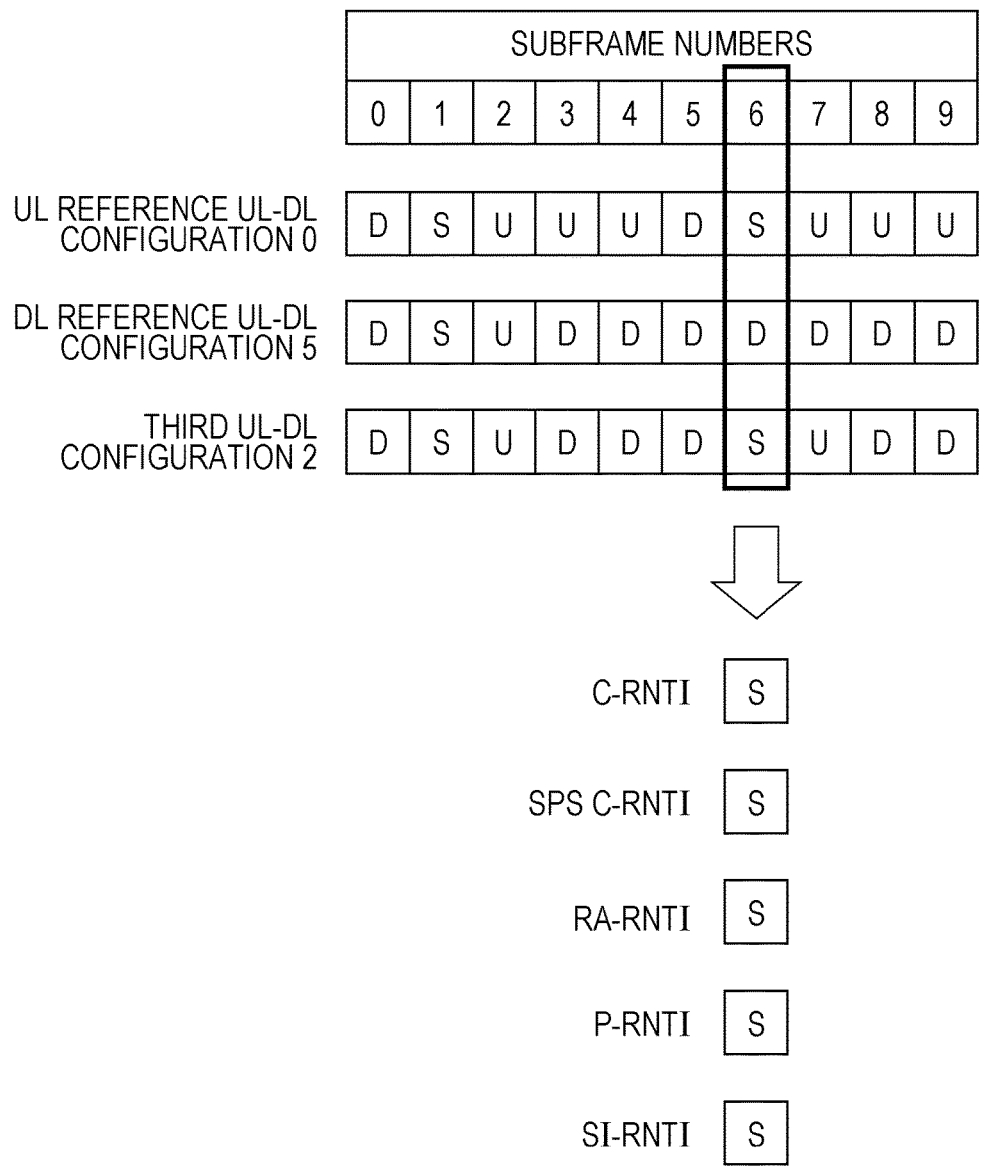
FIG. 17 is another diagram illustrating a method of transmitting and receiving downlink data.

In the description of FIGS. 16 and 17, the DCI formats 1A to which the CRC parity bits scrambled by the C-RNTI, the SPS C-RNTI, the RA-RNTI, the P-RNTI, or the SI-RNTI are attached is all simply referred to as DCI formats 1A.

FIG. 16 is a diagram illustrating a method of transmitting and receiving the downlink data according to the embodiment. FIG. 16 illustrates, for example, a case in which UL reference UL-DL configuration 0, DL reference UL-DL configuration 5, and third UL-DL configuration 3 are set.

Here, subframe 6 in FIG. 16 is a subframe that is configured as the special subframe based on the UL reference UL-DL configuration, is configured as the downlink subframe based on the DL reference UL-DL configuration, and is configured as the downlink subframe based on the third UL-DL configuration.

That is, subframe 6 in FIG. 16 is a subframe that is configured as the special subframe based on the UL reference UL-DL configuration. Further, subframe 6 in FIG. 16 is a subframe that is configured as the downlink subframe based on the DL reference UL-DL configuration. Furthermore, subframe 6 in FIG. 16 is a subframe that is configured as the downlink subframe based on the third UL-DL configuration.

Hereinafter, an operation (process) of the terminal apparatus 1 in subframe 6 of FIG. 16 will be described. Here, in the following description, the operation of the terminal apparatus 1 will be basically described. However, an operation corresponding to the operation of the terminal apparatus 1 is, of course, performed by the base station apparatus 3.

In subframe 6 of FIG. 16, the terminal apparatus 1 may assume subframe 6 as the downlink subframe or the special subframe based on which RNTI is used to scramble the CRC parity bits attached to DCI format 1A and decode the corresponding PDSCH.

For example, in subframe 6 of FIG. 16, the terminal apparatus 1 may assume subframe 6 as the downlink subframe and decode the corresponding PDSCH when the PDSCH is scheduled using DCI format 1A to which the CRC parity bits scrambled by the C-RNTI are attached.

That is, in subframe 6 of FIG. 16, the terminal apparatus 1 may assume subframe 6 as the downlink subframe based on the third UL-DL configuration when the PDSCH is scheduled using DCI format 1A to which the CRC parity bits scrambled by the C-RNTI are attached.

In subframe 6 of FIG. 16, the terminal apparatus 1 may assume subframe 6 as the downlink subframe and decode the corresponding PDSCH when the PDSCH is scheduled using DCI format 1A to which the CRC parity bits scrambled by the SPS C-RNTI are attached.

That is, in subframe 6 of FIG. 16, the terminal apparatus 1 may assume subframe 6 as the downlink subframe based on the third UL-DL configuration when the PDSCH is scheduled using DCI format 1A to which the CRC parity bits scrambled by the SPS C-RNTI are attached.

In subframe 6 of FIG. 16, the terminal apparatus 1 may assume subframe 6 as the downlink subframe and decode the corresponding PDSCH when the PDSCH accompanying no PDCCH is scheduled semi-persistently.

That is, in subframe 6 of FIG. 16, the terminal apparatus 1 may assume subframe 6 as the downlink subframe based on the third UL-DL configuration when the PDSCH accompanying no PDCCH is scheduled semi-persistently.

In subframe 6 of FIG. 16, the terminal apparatus 1 may assume subframe 6 as the special subframe and decode the corresponding PDSCH when the PDSCH accompanying no PDCCH is scheduled semi-persistently.

That is, in subframe 6 of FIG. 16, the terminal apparatus 1 may assume subframe 6 as the special subframe based on the UL reference UL-DL configuration when the PDSCH accompanying no PDCCH is scheduled semi-persistently.

In subframe 6 of FIG. 16, the terminal apparatus 1 may assume subframe 6 as the special subframe and decode the corresponding PDSCH when the PDSCH is scheduled using DCI format 1A to which the CRC parity bits scrambled by the RA-RNTI are attached.

That is, in subframe 6 of FIG. 16, the terminal apparatus 1 may assume subframe 6 as the special subframe based on the UL reference UL-DL configuration when the PDSCH is scheduled using DCI format 1A to which the CRC parity bits scrambled by the RA-RNTI are attached.

In subframe 6 of FIG. 16, the terminal apparatus 1 may assume subframe 6 as the special subframe and decode the corresponding PDSCH when the PDSCH is scheduled using DCI format 1A to which the CRC parity bits scrambled by the P-RNTI are attached.

That is, in subframe 6 of FIG. 16, the terminal apparatus 1 may assume subframe 6 as the special subframe based on the UL reference UL-DL configuration when the PDSCH is scheduled using DCI format 1A to which the CRC parity bits scrambled by the P-RNTI are attached.

In subframe 6 of FIG. 16, the terminal apparatus 1 may assume subframe 6 as the special subframe and decode the corresponding PDSCH when the PDSCH is scheduled using DCI format 1A to which the CRC parity bits scrambled by the SI-RNTI are attached.

That is, in subframe 6 of FIG. 16, the terminal apparatus 1 may assume subframe 6 as the special subframe based on the UL reference UL-DL configuration when the PDSCH is scheduled using DCI format 1A to which the CRC parity bits scrambled by the SI-RNTI are attached.

FIG. 17 is another diagram illustrating a method of transmitting and receiving the downlink data according to the embodiment. FIG. 17 illustrates, for example, a case in which UL reference UL-DL configuration 0, DL reference UL-DL configuration 5, and third UL-DL configuration 2 are set.

Here, subframe 6 in FIG. 17 is a subframe that is configured as the special subframe based on the UL reference UL-DL configuration, is configured as the downlink subframe based on the DL reference UL-DL configuration, and is configured as the special subframe based on the third UL-DL configuration.

That is, subframe 6 in FIG. 17 is a subframe that is configured as the special subframe based on the UL reference UL-DL configuration. Further, subframe 6 in FIG. 17 is a subframe that is configured as the downlink subframe based on the DL reference UL-DL configuration. Furthermore, subframe 6 in FIG. 17 is a subframe that is configured as the special subframe based on the third UL-DL configuration.

Hereinafter, an operation (process) of the terminal apparatus 1 in subframe 6 of FIG. 17 will be described. Here, in the following description, the operation of the terminal apparatus 1 will be basically described. However, an operation corresponding to the operation of the terminal apparatus 1 is, of course, performed by the base station apparatus 3.

In subframe 6 of FIG. 17, the terminal apparatus 1 may assume subframe 6 as the special subframe irrespective of the RNTI used to scramble the CRC parity bits attached to DCI format 1A and decode the corresponding PDSCH.

That is, in subframe 6 of FIG. 17, the terminal apparatus 1 may assume subframe 6 as the special subframe and decode the corresponding PDSCH when the PDSCH is scheduled using DCI format 1A.

That is, in subframe 6 of FIG. 17, the terminal apparatus 1 may assume subframe 6 as the special subframe based on the UL reference UL-DL configuration when the PDSCH is scheduled using DCI format 1A.

In subframe 6 of FIG. 17, the terminal apparatus 1 may assume subframe 6 as the special subframe based on the third UL-DL configuration when the PDSCH is scheduled using DCI format 1A.

In subframe 6 of FIG. 17, the terminal apparatus 1 may assume subframe 6 as the special subframe and decode the corresponding PDSCH when the PDSCH accompanying no PDCCH is scheduled semi-persistently.

That is, in subframe 6 of FIG. 17, the terminal apparatus 1 may assume subframe 6 as the special subframe based on the UL reference UL-DL configuration when the PDSCH accompanying no PDCCH is scheduled semi-persistently.

That is, in subframe 6 of FIG. 17, the terminal apparatus 1 may assume subframe 6 as the special subframe based on the third UL-DL configuration when the PDSCH accompanying no PDCCH is scheduled semi-persistently.

As described above, an operation of the terminal apparatus 1 in subframe 6 in FIG. 16 and an operation of the terminal apparatus 1 in subframe 6 in FIG. 17 are operations when the UL reference UL-DL configuration is set, the DL reference UL-DL configuration is set, and the third UL-DL configuration is set.

Here, in FIGS. 16 and 17, the terminal apparatus 1 detecting the DCI format in subframe 6 may assume subframe 6 as the special subframe and decode the corresponding PDSCH when the UL reference UL-DL configuration is set, the DL reference UL-DL configuration is set, and the third UL-DL configuration is not set.

That is, in FIGS. 16 and 17, the terminal apparatus 1 detecting the DCI format in subframe 6 may assume subframe 6 as the special subframe based on the UL reference UL-DL configuration when the third UL-DL configuration is not set.

In FIGS. 16 and 17, the terminal apparatus 1 detecting the DCI format in subframe 6 may assume subframe 6 as the downlink subframe and decode the corresponding PDSCH when the UL reference UL-DL configuration is set, the DL reference UL-DL configuration is set, and the third UL-DL configuration is not set.

That is, in FIGS. 16 and 17, the terminal apparatus 1 detecting the DCI format in subframe 6 may assume subframe 6 as the downlink subframe based on the DL reference UL-DL configuration when the third UL-DL configuration is not set.

In FIGS. 16 and 17, the terminal apparatus 1 detecting DCI format 1A to which the CRC parity bits scrambled by the C-RNTI or the SPS C-RNTI are attached in subframe 6 may assume subframe 6 as the downlink subframe and decode the corresponding PDSCH when the UL reference UL-DL configuration is set, the DL reference UL-DL configuration is set, and the third UL-DL configuration is not set.

That is, in FIGS. 16 and 17, the terminal apparatus 1 detecting DCI format 1A to which the CRC parity bits scrambled by the C-RNTI or the SPS C-RNTI are attached in subframe 6 may assume subframe 6 as the downlink subframe based on the DL reference UL-DL configuration when the third UL-DL configuration is not set.

In FIGS. 16 and 17, the terminal apparatus 1 detecting DCI format 1A to which the CRC parity bits scrambled by the RA-RNTI, the P-RNTI, or the SI-RNTI are attached in subframe 6 may assume subframe 6 as the special subframe and decode the corresponding PDSCH when the UL reference UL-DL configuration is set, the DL reference UL-DL configuration is set, and the third UL-DL configuration is not set.

That is, in FIGS. 16 and 17, the terminal apparatus 1 detecting DCI format 1A to which the CRC parity bits scrambled by the RA-RNTI, the P-RNTI, or the SI-RNTI are attached in subframe 6 may assume subframe 6 as the special subframe based on the UL reference UL-DL configuration when the third UL-DL configuration is not set.

In FIGS. 16 and 17, the terminal apparatus 1 may assume subframe 6 as the special subframe in the PDSCH accompanying no PDCCH and scheduled semi-persistently in subframe 6 and decode the PDSCH when the UL reference UL-DL configuration is set, the DL reference UL-DL configuration is set, and the third UL-DL configuration is not set.

That is, in FIGS. 16 and 17, the terminal apparatus 1 assume subframe 6 as the special subframe in the PDSCH accompanying no PDCCH and scheduled semi-persistently in subframe 6 based on the UL reference UL-DL configuration when the third UL-DL configuration is not set.

That is, in FIGS. 16 and 17, the terminal apparatus 1 may decode the PDSCH based on the third UL-DL configuration (may assume that the PDSCH is mapped to the resource elements) in regard to the transmission on the PDSCH indicated using DCI format 1A to which the CRC parity bits scrambled by the C-RNTI or the SPS C-RNTI are attached when the third UL-DL configuration is set (when the terminal apparatus 1 has the valid third UL-DL configuration).

In FIGS. 16 and 17, the terminal apparatus 1 may decode the PDSCH based on the first UL-DL configuration (may assume that the PDSCH is mapped to the resource elements) in regard to the transmission on the PDSCH indicated using DCI format 1A to which the CRC parity bits scrambled by the RA-RNTI, the P-RNTI, or the SI-RNTI are attached when the third UL-DL configuration is set (when the terminal apparatus 1 has the valid third UL-DL configuration).

In FIGS. 16 and 17, the terminal apparatus 1 may decode the PDSCH based on the first UL-DL configuration (may assume that the PDSCH is mapped to the resource elements) except for the transmission on the PDSCH indicated using DCI format 1A to which the CRC parity bits scrambled by the C-RNTI or the SPS C-RNTI are attached when the third UL-DL configuration is set (when the terminal apparatus 1 has the valid third UL-DL configuration).

In FIGS. 16 and 17, the terminal apparatus 1 may decode the PDSCH based on the third UL-DL configuration (may assume that the PDSCH is mapped to the resource elements) except for the transmission on the PDSCH indicated using DCI format 1A to which the CRC parity bits scrambled by the RA-RNTI, the P-RNTI, or the SI-RNTI are attached when the third UL-DL configuration is set (when the terminal apparatus 1 has the valid third UL-DL configuration).

In FIGS. 16 and 17, the terminal apparatus 1 may decode the PDSCH based on the first UL-DL configuration (may assume that the PDSCH is mapped to the resource elements) in regard to the transmission on the PDSCH indicated using DCI format 1A to which the CRC parity bits scrambled by the C-RNTI or the SPS C-RNTI are attached when the third UL-DL configuration is not set (when the terminal apparatus 1 does not have the valid third UL-DL configuration).

In FIGS. 16 and 17, the terminal apparatus 1 may decode the PDSCH based on the second UL-DL configuration (may assume that the PDSCH is mapped to the resource elements) in regard to the transmission on the PDSCH indicated using DCI format 1A to which the CRC parity bits scrambled by the C-RNTI or the SPS C-RNTI are attached when the third UL-DL configuration is not set (when the terminal apparatus 1 does not have the valid third UL-DL configuration).

In FIGS. 16 and 17, the terminal apparatus 1 may decode the PDSCH based on the first UL-DL configuration (may assume that the PDSCH is mapped to the resource elements) in regard to the transmission on the PDSCH indicated using DCI format 1A to which the CRC parity bits scrambled by the RA-RNTI, the P-RNTI, or the SI-RNTI are attached when the third UL-DL configuration is not set (when the terminal apparatus 1 does not have the valid third UL-DL configuration).

The structures of the apparatuses according to the embodiment will be described.

Figure 18:
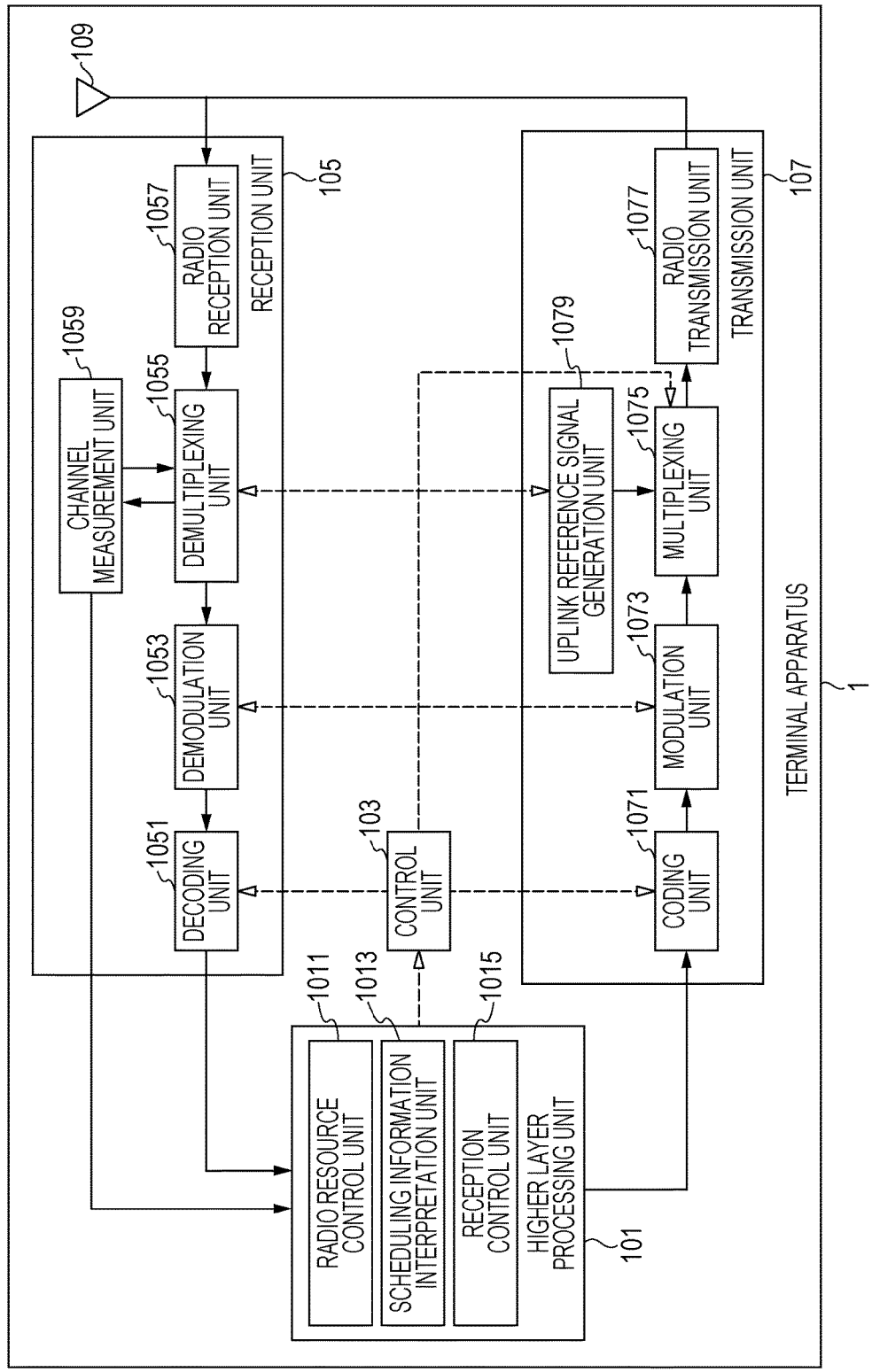
FIG. 18 is a schematic block diagram illustrating the structure of a terminal apparatus 1.

FIG. 18 is a schematic block diagram illustrating the structure of the terminal apparatus 1 according to the embodiment. As illustrated, the terminal apparatus 1 includes a higher layer processing unit 101, a control unit 103, a reception unit 105, a transmission unit 107, and a transmission/reception antenna 109. The higher layer processing unit 101 includes a radio resource control unit 1011, a scheduling information interpretation unit 1013, and a reception control unit 1015. The reception unit 105 includes a decoding unit 1051, a demodulation unit 1053, a demultiplexing unit 1055, a radio reception unit 1057, and a channel measurement unit 1059. The transmission unit 107 includes a coding unit 1071, a modulation unit 1073, a multiplexing unit 1075, a radio transmission unit 1077, and an uplink reference signal generation unit 1079.

The higher layer processing unit 101 outputs the uplink data (transport block) generated through a user's operation or the like to the transmission unit 107. The higher layer processing unit 101 performs processes for a medium access control (MAC) layer, a packet data convergence protocol (PDCP) layer, a radio link control (RLC) layer, and a radio resource control (RRC) layer.

The radio resource control unit 1011 included in the higher layer processing unit 101 manages various kinds of configuration information/parameters of the terminal apparatus. The radio resource control unit 1011 sets various kinds of configuration information/parameters based on signals of the higher layer received from the base station apparatus 3. That is, the radio resource control unit 1011 sets various kinds of configuration information/parameters based on information indicating the various kinds of configuration information/parameters received from the base station apparatus 3. The radio resource control unit 1011 generates information arranged in each uplink channel and outputs the information to the transmission unit 107. The radio resource control unit 1011 is also referred to as the configuration unit 1011.

That is, the radio resource control unit 1011 sets the first UL reference UL-DL configuration, the second UL reference UL-DL configuration, the first DL reference UL-DL configuration, the second DL reference UL-DL configuration, and the third UL-DL configuration.

The scheduling information interpretation unit 1013 included in the higher layer processing unit 101 interprets the DCI format (scheduling information) received via the reception unit 105, generates control information to control the reception unit 105 and the transmission unit 107 based on the analysis result of the DCI format, and outputs the control information to the control unit 103.

The reception control unit 1015 included in the higher layer processing unit 101 controls the reception unit 105 such that the subframe is identified based on the RNTI used to scramble the CRC parity bits attached to the DCI format and the PDSCH is decoded based on the identified subframe. Here, the reception unit 105 may have the function of the reception control unit 1015.

The control unit 103 generates control signals used to control the reception unit 105 and the transmission unit 107 based on the control information from the higher layer processing unit 101. The control unit 103 outputs the generated control signals to the reception unit 105 and the transmission unit 107 to control the reception unit 105 and the transmission unit 107.

The reception unit 105 separates, demodulates, and decodes a received signal received from the base station apparatus 3 via the transmission/reception antenna 109 according to the control signal input from the control unit 103 and outputs decoded information to the higher layer processing unit 101.

The radio reception unit 1057 converts (downconverts) a downlink signal received via the transmission/reception antenna 109 into a baseband signal through quadrature demodulation, removes an unnecessary frequency component, controls an amplification level so that the signal level is appropriately maintained, performs the quadrature demodulation based on an in-phase component and a quadrature component of the received signal, and converts the analog signal subjected to the quadrature demodulation into a digital signal. The radio reception unit 1057 removes a portion corresponding to the cyclic prefix (CP) from the converted digital signal and performs fast Fourier transform (FFT) on the signal from which the CP is removed to extract a signal of the frequency region.

The demultiplexing unit 1055 separates the extracted signal into the PHICH, the PDCCH, the EPDCCH, the PDSCH, and the downlink reference signal. The demultiplexing unit 1055 compensates for channels of the PHICH, the PDCCH, the EPDCCH, and the PDSCH from estimated values of the channels input from the channel measurement unit 1059. The demultiplexing unit 1055 outputs the separated downlink reference signal to the channel measurement unit 1059.

The demodulation unit 1053 multiplies a corresponding code to the PHICH to combine the code, demodulates the combined signal according to the BPSK (binary phase shift keying) modulation scheme, and outputs the demodulated signal to the decoding unit 1051. The decoding unit 1051 decodes the PHICH for the terminal apparatus and outputs the decoded HARQ indicator to the higher layer processing unit 101. The demodulation unit 1053 demodulates the PDCCH and/or the EPDCCH according to the QPSK demodulation scheme and outputs the demodulated signal to the decoding unit 1051. The decoding unit 1051 attempts to decode the PDCCH and/or the EPDCCH. When the decoding unit 1051 succeeds in the decoding, the decoding unit 1051 outputs decoded downlink control information and the RNTI corresponding to the downlink control information to the higher layer processing unit 101.

The demodulation unit 1053 performs demodulation on the PDSCH according to a demodulation scheme notified of with the downlink grant, such as the QPSK (quadrature phase shift keying), 16 QAM (quadrature amplitude modulation), or 64 QAM and outputs the demodulated result to the decoding unit 1051. The decoding unit 1051 performs decoding based on information regarding the encoding ratio notified of with the downlink control information and outputs the decoded downlink data (transport block) to the higher layer processing unit 101.

The channel measurement unit 1059 measures a path loss or a channel state of the downlink from the downlink reference signal input from the demultiplexing unit 1055 and outputs the measured path loss or channel state to the higher layer processing unit 101. The channel measurement unit 1059 calculates an estimated value of the downlink channel from the downlink reference signal and outputs the estimated value to the demultiplexing unit 1055. The channel measurement unit 1059 performs channel measurement and/or interference measurement to calculate the CQI.

The transmission unit 107 generates an uplink reference signal according to the control signal input from the control unit 103, codes and modulates the uplink data (transport block) input from the higher layer processing unit 101, multiplexes the PUCCH, the PUSCH, and the generated uplink reference signal, and transmits the multiplexed PUCCH, PUSCH, and uplink reference signal to the base station apparatus 3 via the transmission/reception antenna 109.

The coding unit 1071 performs coding such as convolutional coding or block coding on the uplink control information input from the higher layer processing unit 101. The coding unit 1071 performs turbo coding based on information used to schedule the PUSCH.

The modulation unit 1073 modulates the coded bits input from the coding unit 1071 according to a modulation scheme notified of with the downlink control information, such as the BPSK, the QPSK, the 16 QAM, or the 64 QAM or a modulation scheme determined in advance for each channel. The modulation unit 1073 determines the number of series of spatially multiplexed data based on the information used for the scheduling of the PUSCH, maps the plurality of pieces of uplink data transmitted with the same PUSCH to the plurality of series by using MIMO (multiple input multiple output) SM (Spatial Multiplexing), and performs precoding on the series.

The uplink reference signal generation unit 1079 generates a series obtained by a rule (expression) determined in advance based on a physical cell identity (PCI: referred to as a Cell ID or the like) for identifying the base station apparatus 3, a bandwidth in which the uplink reference signal is arranged, a cyclic shift notified of with the uplink grant, the values of parameters for generation of a DMRS sequence, and the like. The multiplexing unit 1075 sorts the modulation symbols of the PUSCH in parallel according to the control signal input from the control unit 103, and then performs discrete Fourier transform (DFT). The multiplexing unit 1075 multiplexes the signals of the PUCCH and the PUSCH and the generated uplink reference signal for each transmission antenna port. That is, the multiplexing unit 1075 arranges the signals of the PUCCH and the PUSCH and the generated uplink reference signal in the resource element for each transmission antenna port.

The radio transmission unit 1077 performs inverse fast Fourier transform (IFFT) on the multiplexed signals, generates the SC-FDMA symbols, adds the CP to the generated SC-FDMA symbols, generates a baseband digital signal, converts the baseband digital signal into an analog signal, removes an excessive frequency component using a lowpass filter, performs upconverting on a carrier frequency, performs power amplification, and outputs the signal to the transmission/reception antenna 109 to transmit the signal.

Figure 19:
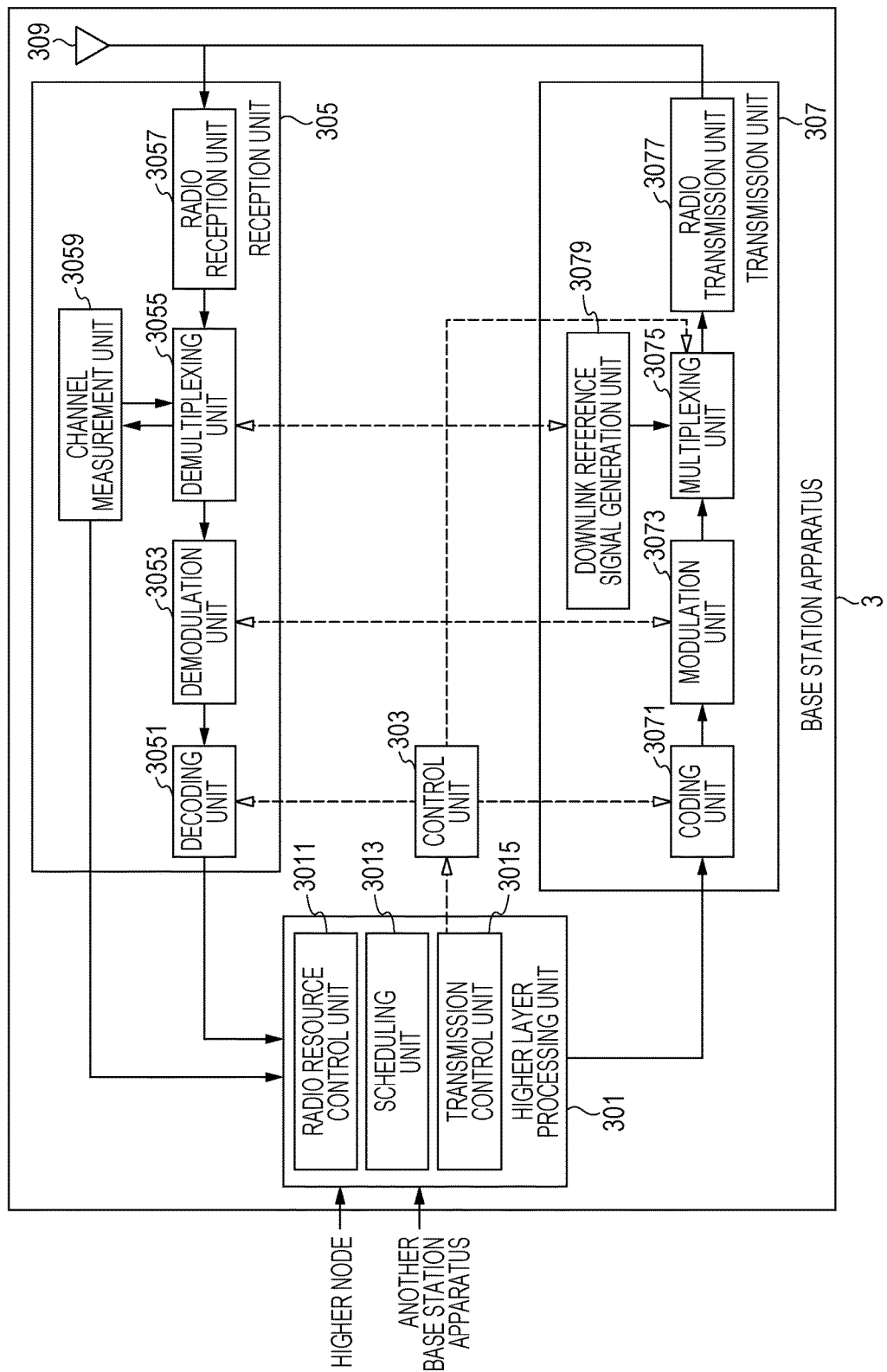
FIG. 19 is a schematic block diagram illustrating the structure of a base station apparatus 3.

FIG. 19 is a schematic block diagram illustrating the structure of a base station apparatus 3 according to the embodiment. As illustrated, the base station apparatus 3 includes a higher layer processing unit 301, a control unit 303, a reception unit 305, a transmission unit 307, and a transmission/reception antenna 309. The higher layer processing unit 301 includes a radio resource control unit 3011, a scheduling unit 3013, and transmission control unit 3015. The reception unit 305 includes a decoding unit 3051, a demodulation unit 3053, a demultiplexing unit 3055, a radio reception unit 3057, and a channel measurement unit 3059. The transmission unit 307 includes a coding unit 3071, a modulation unit 3073, a multiplexing unit 3075, a radio transmission unit 3077, and a downlink reference signal generation unit 3079.

The higher layer processing unit 301 performs processes for a medium access control (MAC) layer, a packet data convergence protocol (PDCP) layer, a radio link control (RLC) layer, and a radio resource control (RRC) layer. The higher layer processing unit 301 generates control information to control the reception unit 305 and the transmission unit 307 and outputs the control information to the control unit 303.

The radio resource control unit 3011 included in the higher layer processing unit 301 generates the downlink data (transport block) arranged in the downlink PDSCH, the system information, the RRC message, the MAC CE (Control Element), and the like or acquires the downlink data, the downlink PDSCH, the system information, the RRC message, the MAC CE, and the like from a higher node, and then outputs the downlink data, the downlink PDSCH, the system information, the RRC message, the MAC CE, and the like to the transmission unit 307. The radio resource control unit 3011 manages various kinds of configuration information/parameters of each terminal apparatus 1. The radio resource control unit 3011 may set various kinds of configuration information/parameters in the terminal apparatus 1 via the signals of the higher layer. That is, the radio resource control unit 1011 transmits/reports information indicating the various kinds of configuration information/parameters. The radio resource control unit 3011 is also referred to as the configuration unit 3011.

That is, the radio resource control unit 3011 configures the first UL reference UL-DL configuration, the second UL reference UL-DL configuration, the first DL reference UL-DL configuration, the second DL reference UL-DL configuration, and the third UL-DL configuration in each terminal apparatus 1.

The scheduling unit 3013 included in the higher layer processing unit 301 determines the frequencies and the subframes for allocating the physical channels (the PDSCH and the PUSCH) and the coding rate, modulation scheme, transmission power, and the like of the physical channels (the PDSCH and the PUSCH) for allocating the physical channels (the PDSCH and the PUSCH) from the received channel state information, the estimated value of the channel or the channel quality input from the channel measurement unit 3059, and the like. The scheduling unit 3013 generates control information (for example, the DCI format) to control the reception unit 305 and the transmission unit 307 based on the scheduling result and outputs the control information to the control unit 303. The scheduling unit 3013 decides timings at which the transmission process and the reception process are performed.

The transmission control unit 3015 included in the higher layer processing unit 301 controls the transmission unit 307 such that the PDSCH is mapped to the resource element based on the RNTI used to scramble the CRC parity bits attached to the DCI format and the transmission on the PDSCH is performed. Here, the transmission unit 307 may have the function of the transmission control unit 3015.

Based on the control information from the higher layer processing unit 301, the control unit 303 generates the control signal to control the reception unit 305 and the transmission unit 307. The control unit 303 outputs the generated control signal to the reception unit 305 and the transmission unit 307 to control the reception unit 305 and the transmission unit 307.

The reception unit 305 separates, demodulates, and decodes the received signal received from the terminal apparatus 1 via the transmission/reception antenna 309 according to the control signal input from the control unit 303 and outputs the decoded information to the higher layer processing unit 301. The radio reception unit 3057 converts (downconverts) the uplink signal received via the transmission/reception antenna 309 into a baseband signal through quadrature demodulation, removes an unnecessary frequency component, controls an amplification level so the signal level is appropriately maintained, performs the quadrature demodulation based on an in-phase component and a quadrature component of the received signal, and converts the analog signal subjected to the quadrature demodulation into a digital signal.

The radio reception unit 3057 removes a portion corresponding to the CP (cyclic prefix) from the converted digital signal. The radio reception unit 3057 performs fast Fourier transform (FFT) on the signal from which the CP is removed to extract a signal of the frequency region and outputs the extracted signal to the demultiplexing unit 3055.

The demultiplexing unit 0355 demultiplexes the signal input from the radio reception unit 3057 into signals such as the PUCCH, the PUSCH, and the uplink reference signal. The demultiplexing is decided by the radio resource control unit 3011 of the base station apparatus 3 in advance and is performed based on allocation information of the radio resource included in the uplink grant of which each terminal apparatus 1 is notified. The demultiplexing unit 3055 compensates for the channel of the PUCCH and the PUSCH from the estimated value of the channel input from the channel measurement unit 3059. The demultiplexing unit 3055 outputs the separated uplink reference signals to the channel measurement unit 3059.

The demodulation unit 3053 performs inverse discrete Fourier transform (IDFT) on the PUSCH, acquires the modulation symbols, and demodulates the received signal on each of the modulation symbols of the PUCCH and the PUSCH using a modulation scheme determined in advance, such as binary phase shift keying (BPSK), QPSK, 16 QAM, or 64 QAM, or a modulation scheme of which the base station apparatus notifies each terminal apparatus 1 in advance with the uplink grant. The demodulation unit 3053 separates the modulation symbols of the plurality of pieces of uplink data transmitted with the same PUSCH by using the MIMO SM, based on the number of spatially multiplexed series of which each terminal apparatus 1 is notified in advance with the uplink grant and information indicating the precoding performed on the series.

The decoding unit 3051 decodes the demodulated coded bits of the PUCCH and the PUSCH at the coding rate which is the coding rate of the coding scheme determined in advance and which is determined in advance or of which the base station apparatus notifies the terminal apparatus 1 in advance with the uplink grant, and then outputs the decoded uplink data and the uplink control information to the higher layer processing unit 301. When the PUSCH is retransmitted, the decoding unit 3051 performs the decoding using the coded bits input from the higher layer processing unit 301 and retained in an HARQ buffer and the demodulated coded bits. The channel measurement unit 309 measures an estimated value of the channel, the channel quality, and the like from the uplink reference signal input from the demultiplexing unit 3055 and outputs the estimated value, the channel quality, and the like to the demultiplexing unit 3055 and the higher layer processing unit 301.

The transmission unit 307 generates the downlink reference signal according to the control signal input from the control unit 303, codes and modulates the HARQ indicator, the downlink control information, and the downlink data input from the higher layer processing unit 301, multiplexes the PHICH, the PDCCH, the EPDCCH, the PDSCH, and the downlink reference signal, and transmits the multiplexed signals to the terminal apparatus 1 via the transmission/reception antenna 309.

The coding unit 3071 codes the HARQ indicator, the downlink control information, and the downlink data input from the higher layer processing unit 301 using a coding scheme determined in advance, such as block coding, convolutional coding, or turbo coding or codes the HARQ indicator, the downlink control information, and the downlink data using the coding scheme determined by the radio resource control unit 3011. The modulation unit 3073 modulates the coded bits input from the coding unit 3071 according to the modulation scheme determined in advance, such as the BPSK, the QPSK, the 16 QAM, or the 64 QAM, or the modulation scheme determined by the radio resource control unit 3011.

The downlink reference signal generation unit 3079 generates the series which are obtained according to a rule determined in advance based on the physical layer cell identifier (PCI) or the like for identifying the base station apparatus 3 and is known by the terminal apparatus 1, as the downlink reference signal. The multiplexing unit 3075 multiplexes the modulated modulation symbol of each channel and the generated downlink reference signal. That is, the multiplexing unit 3075 arranges the modulated modulation symbol of each channel and the generated downlink reference signal in the resource element.

The radio transmission unit 3077 performs inverse fast Fourier transform (IFFT) on the multiplexed modulation symbols, generates the OFDM symbols, adds the CP to the generated OFDM symbols, generates a baseband digital signal, converts the baseband digital signal into an analog signal, removes an excessive frequency component using a lowpass filter, performs upconverting on a carrier frequency, performs power amplification, and outputs the signal to the transmission/reception antenna 309 to transmit the signal.

More specifically, the terminal apparatus 1 according to the embodiment includes the control unit (the radio resource control unit 1011) that sets the first UL-DL configuration (the UL reference UL-DL configuration), sets the second UL-DL configuration (the DL reference UL-DL configuration), and sets the third UL-DL configuration.

The terminal apparatus 1 according to the embodiment includes a reception unit (the reception unit 105) that assumes the downlink subframe based on the third UL-DL configuration in the same subframe as the subframe in which downlink control information format 1A to which the CRC parity bits scrambled by the C-RNTI are attached is detected and decodes the corresponding PDSCH, when the downlink control information format 1A to which the CRC parity bits scrambled by the C-RNTI or the SPS C-RNTI are attached is detected in the subframe indicated as the special subframe based on the first UL-DL configuration (the UL reference UL-DL configuration) and indicated as the downlink subframe based on the third UL-DL configuration.

The terminal apparatus 1 according to the embodiment includes a reception unit (the reception unit 105) that assumes the special subframe based on the first UL-DL configuration (the UL reference UL-DL configuration) in the same subframe as the subframe in which downlink control information format 1A to which the CRC parity bits scrambled by the RA-RNTI, the P-RNTI, or the SI-RNTI are attached is detected and decodes the corresponding PDSCH, when the downlink control information format 1A to which the CRC parity bits scrambled by the RA-RNTI, the P-RNTI, or the SI-RNTI are attached is detected in the subframe indicated as the special subframe based on the first UL-DL configuration (the UL reference UL-DL configuration) and indicated as the downlink subframe based on the third UL-DL configuration.

The reception unit (the reception unit 105) may assume the special subframe in the same subframe as the subframe in which downlink control information format 1A is detected and decode the corresponding PDSCH, when downlink control information format 1A is detected in the subframe indicated as the special subframe based on the first UL-DL configuration (the UL reference UL-DL configuration) and indicated as the special subframe based on the third UL-DL configuration.

The reception unit (the reception unit 105) may assume the special subframe based on the first UL-DL configuration (the UL reference UL-DL configuration) in the same subframe as the subframe in which downlink control information format 1A is detected and decode the corresponding PDSCH, when the third UL-DL configuration is not set and when downlink control information format 1A is detected in the subframe indicated as the special subframe based on the first UL-DL configuration (the UL reference UL-DL configuration).

The base station apparatus 3 according to the embodiment includes a control unit (the radio resource control unit 3011) that sets the first UL-DL configuration (the UL reference UL-DL configuration), sets the second UL-DL configuration (the DL reference UL-DL configuration), and sets the third UL-DL configuration.

The base station apparatus 3 according to the embodiment includes a transmission unit (the transmission unit 307) that assumes the downlink subframe based on the third UL-DL configuration and maps the PDSCH corresponding to downlink control information format 1A to which the CRC parity bits scrambled by the C-RNTI or the SPS C-RNTI are attached, to the resource elements when the PDSCH is scheduled using downlink control information format 1A to which the CRC parity bits scrambled by the C-RNTI or the SPS C-RNTI are attached in the subframe indicated as the special downlink subframe based on the first UL-DL configuration (the UL reference UL-DL configuration) and indicated as the downlink subframe based on the third UL-DL configuration.

The base station apparatus 3 according to the embodiment includes a transmission unit (the transmission unit 307) that assumes the downlink subframe based on the first UL-DL configuration (the UL reference UL-DL configuration) and maps the PDSCH corresponding to downlink control information format 1A to which the CRC parity bits scrambled by the RA-RNTI, the P-RNTI, or the SI-RNTI are attached, to the resource elements when the PDSCH is scheduled using downlink control information format 1A to which the CRC parity bits scrambled by the RA-RNTI, the P-RNTI, or the SI-RNTI are attached in the subframe indicated as the special subframe based on the first UL-DL configuration (the UL reference UL-DL configuration) and indicated as the downlink subframe based on the third UL-DL configuration.

The transmission unit (the transmission unit 307) assumes the special subframe and maps the PDSCH corresponding to downlink control information format 1A to the resource elements, when the PDSCH is scheduled using downlink control information format 1A in the subframe indicated as the special subframe based on the first UL-DL configuration (the UL reference UL-DL configuration) and indicated as the special subframe based on the third UL-DL configuration.

The transmission unit (the transmission unit 307) assumes the special subframe based on the first UL-DL configuration (the UL reference UL-DL configuration) and maps the PDSCH corresponding to downlink control information format 1A to the resource elements, when the third UL-DL configuration is not set and when the PDSCH is scheduled using downlink control information format 1A in the subframe indicated as the special subframe based on the first UL-DL configuration (the UL reference UL-DL configuration).

As described above, the base station apparatus 3 and the terminal apparatus 1 may assume the subframe as the downlink subframe or the special subframe in which the reception process in the PDSCH is performed based on which RNTI is used to scramble the CRC parity bits attached to the DCI format and decode the corresponding PDSCH. That is, the base station apparatus 3 and the terminal apparatus 1 may assume the PDSCH to the resource elements according to another method (reference or condition) based on which RNTI is used to scramble the CRC parity bits attached to the DCI format is scrambled.

When the PDSCH is scheduled using the DCI format to which the CRC parity bits scrambled by the RA-RNTI, the P-RNTI, or the SI-RNTI are attached, the terminal apparatus 1 assumes the downlink subframe based on the UL reference UL-DL configuration and decodes the PDSCH, so that the terminal apparatus 1 and a previously released terminal apparatus (for example, a terminal apparatus corresponding to any of LTE Rel. 8 to LTE Rel. 10) can coexist and more efficient communication can be performed in a radio communication system.

As described above, the base station apparatus 3 and the terminal apparatus 1 may assume the subframe in which the reception process in the PDSCH is performed as the downlink subframe or the special subframe based on whether the PDSCH accompanies the PDCCH and may decode the corresponding PDSCH. That is, the base station apparatus 3 and the terminal apparatus 1 may also assume that the PDSCH is mapped to the resource elements according to another method (reference or condition) based on whether the PDSCH accompanies the PDCCH.

Accordingly, it is possible to efficiently transmit and receive downlink data.

A program operating in the base station apparatus 3 and the terminal apparatus 1 according to the present invention may be a program (a program enabling a computer to function) controlling a CPU (central processing unit) or the like so that the functions of the foregoing embodiment of the present invention are realized. Information handled in these apparatuses is temporarily stored in a RAM (random access memory) at the time of processing of the information. Thereafter, the information is stored in any of various ROMs (read-only memories) such as a flash ROM or an HDD (hard disk drive), is read by the CPU, as necessary, and is corrected and written.

Parts of the terminal apparatus 1 and the base station apparatus 3 according to the above-described embodiment may be realized in a computer. In this case, a program for realizing the control functions may be recorded in a computer-readable recording medium and the program recorded in the recording medium may be read by a computer system to be executed so that the control functions are realized.

The "computer system" mentioned herein refers to a computer system included in the terminal apparatus 1 or the base station apparatus 3 and is assumed to include an OS or hardware such as a peripheral device. The "computer-readable recording medium" refers to a portable medium such as a flexible disk, a magneto-optical disc, a ROM, or a CD-ROM or a storage device such as a hard disk included in the computer system.

Further, the "computer-readable recording medium" may include a communication line that dynamically retains a program in a short time when a program is transmitted via the communication circuit, such as a network such as the Internet or a telephone line and a memory that retains a program for a given time, such as a volatile memory in a computer system serving as a server or a client in that case. The program may be a program that realizes some of the above-described functions or may be a program which further realizes the above-described functions in combination with a program already recorded in the computer system.

The base station apparatus 3 according to the above-described embodiment may be realized as a collective (apparatus group) including a plurality of apparatuses. Each of the apparatuses included in the apparatus group may have each function or some or all of the functional blocks of the base station apparatus 3 according to the above-described embodiment. The apparatus group may have each function or each normal functional block of the base station apparatus 3. The terminal apparatus 1 according to the above-described embodiment may also communicate with the base station apparatus serving as the collective.

The base station apparatus 3 according to the above-described embodiment may be an evolved universal terrestrial radio access network (EUTRAN). The base station apparatus 3 according to the above-described embodiment may have some or all of the functions of a higher node with respect to an eNodeB.

Parts or the entireties of the terminal apparatus 1 and the base station apparatus 3 according to the above-described embodiment may be generally realized as an LSI which is an integrated circuit or may be realized as a chip set. The functional blocks of the terminal apparatus 1 and the base station apparatus 3 may be individually chipped or some or all of the functional blocks may be integrated and chipped. A method of forming an integrated circuit is not limited to an LSI, but a dedicated circuit or a general processor may be realized. When a technology for making integrated circuits in place of the LSI appears with advance in semiconductor technologies, an integrated circuit by this technology can also be used.

In the above-described embodiment, the terminal apparatus has been described as an example of a communication apparatus, but the present invention is not limited thereto. The invention can also be applied to terminal apparatuses or communication apparatuses such as stationary or non-movable type electronic apparatuses installed indoors and outdoors, e.g., AV apparatuses, kitchen apparatuses, cleaning and washing apparatuses, air conditioning apparatuses, office apparatuses, vending machines, and other living apparatuses.

The embodiments of the present invention have been described in detail with reference to the drawings, but specific configurations are not limited to the embodiments. Modifications of design within the scope of the present invention without departing from the gist of the present invention are also included. The present invention can be modified in various ways within the scope described in the claims and embodiments obtained by appropriately combining technical means disclosed in other embodiments are also included in the technical scope of the present invention. The elements described in the embodiments and obtaining the same advantageous effects are substituted are also included.

INDUSTRIAL APPLICABILITY

The invention can be applied to a mobile phone, a personal computer, a tablet computer, and the like.

DESCRIPTION OF REFERENCE NUMERALS 1 (1A, 1B, 1C) TERMINAL APPARATUS
3 BASE STATION APPARATUS
101 HIGHER LAYER PROCESSING UNIT
103 CONTROL UNIT
105 RECEPTION UNIT
107 TRANSMISSION UNIT
301 HIGHER LAYER PROCESSING UNIT
303 CONTROL UNIT
305 RECEPTION UNIT
307 TRANSMISSION UNIT
1011 RADIO RESOURCE CONTROL UNIT
1013 SCHEDULING INFORMATION INTERPRETATION UNIT
1015 RECEPTION CONTROL UNIT
3011 RADIO RESOURCE CONTROL UNIT
3013 SCHEDULING UNIT
3015 TRANSMISSION CONTROL UNIT

The invention claimed is:

1. A terminal apparatus that is configured to communicate with a base station apparatus, the terminal apparatus comprising:
receiving circuitry configured to:
receive first information indicating a first uplink-downlink configuration; receive second information indicating a second uplink-downlink configuration; and
receive, on a physical downlink control channel, third information indicating a third uplink-downlink configuration; and
transmitting circuitry configured to:
transmit Hybrid Automatic Repeat Request-Acknowledgement ACK (HARQ-ACK) in a subframe n1, the HARQ-ACK being for a transmission of a physical downlink shared channel that is detected in a subframe n1−k1; and
transmit the HARQ-ACK in a subframe n2, the HARQ-ACK being for the transmission of the physical downlink shared channel that is detected in a subframe n2−k2, wherein
in a case that the physical downlink control channel on which the third information is transmitted is detected and downlink control information to which Cyclic Redundancy Check (CRC) parity bits scrambled by a Cell-Radio Network Temporary Identifier (C-RNTI) are attached is detected in the subframe n1−k1 that is indicated as a special subframe based on the first uplink-downlink configuration and is indicated as a downlink subframe based on the third uplink-downlink configuration, the physical downlink shared channel is detected in the subframe n1−k1 by assuming the subframe n1−k1 to be the downlink subframe based on the third uplink-downlink configuration,
in a case that the physical downlink control channel on which the third information is transmitted is not detected and downlink control information to which CRC parity bits scrambled by the C-RNTI are attached is detected in the subframe n2−k2 that is indicated as a special subframe based on the first uplink-downlink configuration, the physical downlink shared channel is detected in the subframe n2−k2 by assuming the subframe n2−k2 to be the special subframe based on the first uplink-downlink configuration, and the k1 and the k2 are given by the second uplink-downlink configuration.

2. A base station apparatus that is configured to communicate with a terminal apparatus, the base station apparatus comprising:

transmitting circuitry configured to:

transmit first information indicating a first uplink-downlink configuration; transmit second information indicating a second uplink-downlink configuration; and transmit, on a physical downlink control channel, third information indicating a third uplink-downlink configuration; and receiving circuitry configured to:

receive Hybrid Automatic Repeat Request-Acknowledgement ACK (HARQ-ACK) in a subframe n1, the HARQ-ACK being for a transmission of a physical downlink shared channel that is detected in a subframe n1−k1; and receive the HARQ-ACK in a subframe n2, the HARQ-ACK being for the transmission of the physical downlink shared channel that is detected in a subframe n2−k2, wherein in a case that the physical downlink control channel on which the third information is transmitted is scheduled and downlink control information to which Cyclic Redundancy Check (CRC) parity bits scrambled by a Cell-Radio Network Temporary Identifier (C-RNTI) are attached is transmitted in the subframe n1−k1 that is indicated as a special subframe based on the first uplink-downlink configuration and is indicated as a downlink subframe based on the third uplink-downlink configuration, the physical downlink shared channel is scheduled in the subframe n1−k1 by assuming the subframe n1−k1 to be the downlink subframe based on the third uplink-downlink configuration, in a case that the physical downlink control channel on which the third information is transmitted is not scheduled and downlink control information to which CRC parity bits scrambled by the C-RNTI are attached is transmitted in the subframe n2−k2 that is indicated as a special subframe based on the first uplink-downlink configuration, the physical downlink shared channel is scheduled in the subframe n2−k2 by assuming, the subframe n2−k2 to be the special subframe based on the first uplink-downlink configuration, and the k1 and the k2 are given by the second uplink-downlink configuration.

3. A communication method of a terminal apparatus that is configured to communicate with a base station apparatus, the communication method comprising:

receiving first information indicating a first uplink-downlink configuration, receiving second information indicating a second uplink-downlink configuration, receiving, on a physical downlink control channel, third information indicating a third uplink-downlink configuration, transmitting Hybrid Automatic Repeat Request-Acknowledgement (HARQ-ACK) in a subframe n1, the HARQ-ACK being for a transmission of a physical downlink shared channel that is detected in a subframe n1−k1, and transmitting the HARQ-ACK in a subframe n2, the HARQ-ACK being for the transmission of the physical downlink shared channel that is detected in a subframe n2−k2, wherein in a case that the physical downlink control channel on which the third information is transmitted is detected and downlink control information to which Cyclic Redundancy Check (CRC) parity bits scrambled by a Cell-Radio Network Temporary Identifier (C-RNTI) are attached is detected in the subframe n1−k1 that is indicated as a special subframe based on the first uplink-downlink configuration and is indicated as a downlink subframe based on the third uplink-downlink configuration, the physical downlink shared channel is detected in the subframe n1−k1 by assuming the subframe n1−k1 to be the downlink subframe based on the third uplink-downlink configuration, in a case that the physical downlink control channel on which the third information is transmitted is not detected and downlink control information to which CRC parity bits scrambled by the C-RNTI are attached is detected in the subframe n2−k2 that is indicated as a special subframe based on the first uplink-downlink configuration, the physical downlink shared channel is detected in the subframe n2−k2 by assuming the subframe n2−k2 to be the special subframe based on the first uplink-downlink configuration, and the k1 and the k2 are given by the second uplink-downlink configuration.

4. A communication method of a base station apparatus that is configured to communicate with a terminal apparatus, the communication method comprising:

transmitting first information indicating a first uplink-downlink configuration, transmitting second information indicating a second uplink-downlink configuration, transmitting, on a physical downlink control channel, third information indicating a third uplink-downlink configuration receiving Hybrid Automatic Repeat Request-Acknowledgement (HARQ-ACK) in a subframe n1, the HARQ-ACK being for a transmission of a physical downlink shared channel that is detected in a subframe n1−k1, and receiving the HARQ-ACK in a subframe n2, the HARQ-ACK being for the transmission of the physical downlink shared channel that is detected in a subframe n2−k2, wherein in a case that the physical downlink control channel on which the third information is transmitted is scheduled and downlink control information to which Cyclic Redundancy Check (CRC) parity bits scrambled by a Cell-Radio Network Temporary Identifier (C-RNTI) are attached is transmitted in the subframe n1−k1 that is indicated as a special subframe based on the first uplink-downlink configuration and is indicated as a downlink subframe based on the third uplink-downlink configuration, the physical downlink shared channel is scheduled in the subframe n1−k1 by assuming the subframe n1−k1 to be the downlink subframe based on the third uplink-downlink configuration, in a case that the physical downlink control channel on which the third information is transmitted is not scheduled and downlink control information to which CRC parity bits scrambled by the C-RNTI are attached is transmitted in the subframe n2−k2 that is indicated as a special subframe based on the first uplink-downlink configuration, the physical downlink shared channel is scheduled in the subframe n2−k2 by assuming the subframe n2−k2 to be the special subframe based on the first uplink-downlink configuration, and the k1 and the k2 are given by the second uplink-downlink configuration.

* * * * *